United States Patent
Obama et al.

(10) Patent No.: US 10,168,512 B2
(45) Date of Patent: Jan. 1, 2019

(54) VARIABLE MAGNIFICATION OPTICAL SYSTEM, OPTICAL DEVICE, AND PRODUCTION METHOD FOR VARIABLE MAGNIFICATION OPTICAL SYSTEM

(71) Applicant: Nikon Corporation, Tokyo (JP)

(72) Inventors: Akihiko Obama, Tokyo (JP); Tomoyuki Sashima, Tokyo (JP)

(73) Assignee: Nikon Corporation, Tokyo (JP)

( * ) Notice: Subject to any disclaimer, the term of this patent is extended or adjusted under 35 U.S.C. 154(b) by 293 days.

(21) Appl. No.: 14/700,493

(22) Filed: Apr. 30, 2015

(65) Prior Publication Data

US 2015/0234161 A1 Aug. 20, 2015

Related U.S. Application Data

(63) Continuation of application No. PCT/JP2013/079240, filed on Oct. 29, 2013.

(30) Foreign Application Priority Data

Oct. 30, 2012 (JP) ................................ 2012-238735
Oct. 30, 2012 (JP) ................................ 2012-238736

(51) Int. Cl.
G02B 15/14 (2006.01)

(52) U.S. Cl.
CPC ........... *G02B 15/14* (2013.01); *Y10T 29/4984* (2015.01)

(58) Field of Classification Search
CPC .................................................... G02B 15/14

(Continued)

(56) References Cited

U.S. PATENT DOCUMENTS 5,666,229 A   9/1997 Ohtake
5,684,639 A   11/1997 Ohtake
(Continued)

FOREIGN PATENT DOCUMENTS

JP   07-049453 A   2/1995
JP   07-253539 A   10/1995
(Continued)

OTHER PUBLICATIONS

International Search Report from International Patent Application No. PCT/JP2013/079240, dated Feb. 4, 2014.
(Continued)

*Primary Examiner* — James Jones
(74) *Attorney, Agent, or Firm* — Shapiro, Gabor and Rosenberger, PLLC

(57) ABSTRACT

Composing, in order from an object side: a first lens group having positive refractive power; a second lens group having negative refractive power; and a third lens group having positive refractive power; upon zooming from a wide-angle end state to a telephoto end state, a distance between the first lens group and the second lens group, a distance between the second lens group and the third lens group and a distance between the third lens group and an image plane being varied; on the most image side, a fixed lens group being fixed in a position upon zooming from the wide-angle end state to the telephoto end state; and the third lens group being moved in the direction of the optical axis upon focusing from an infinite distance object to a near distance object, thereby providing a small-size variable magnification optical system having a high zoom ratio and an excellent optical performance upon focusing from an infinite distance object to a near distance object, an optical apparatus, and a method for manufacturing the variable magnification optical system.

21 Claims, 23 Drawing Sheets

(58) Field of Classification Search
USPC .......................................................... 359/690
See application file for complete search history.

(56) References Cited

U.S. PATENT DOCUMENTS

| | | | |
|---|---|---|---|
| 5,691,851 A | 11/1997 | Nishio et al. | |
| 5,831,768 A | 11/1998 | Ohtake | |
| 6,028,716 A | 2/2000 | Kato et al. | |
| 6,249,389 B1 | 6/2001 | Ohtake | |
| 6,414,800 B1 | 7/2002 | Hamano | |
| 7,180,682 B1 | 2/2007 | Terada | |
| 7,907,349 B2 | 3/2011 | Katakura | |
| 2007/0058268 A1 | 3/2007 | Terada | |
| 2010/0007966 A1 | 1/2010 | Katakura | |
| 2010/0091171 A1 | 4/2010 | Miyazaki et al. | |
| 2011/0102905 A1 | 5/2011 | Harada | |
| 2011/0228407 A1 | 9/2011 | Yamaguchi | |
| 2012/0194918 A1 | 8/2012 | Yamaguchi | |
| 2013/0286277 A1* | 10/2013 | Yanai | G02B 15/14 348/345 |

FOREIGN PATENT DOCUMENTS

| | | |
|---|---|---|
| JP | 07-261086 A | 10/1995 |
| JP | 08-050245 A | 2/1996 |
| JP | 08-101362 A | 4/1996 |
| JP | 08-146354 A | 6/1996 |
| JP | 08-179214 A | 7/1996 |
| JP | 08-190052 A | 7/1996 |
| JP | 11-271614 A | 10/1999 |
| JP | 11-295595 A | 10/1999 |
| JP | 2000-275525 A | 10/2000 |
| JP | 2002-098893 A | 4/2002 |
| JP | 2004-061681 A | 2/2004 |
| JP | 2004-102089 A | 4/2004 |
| JP | 2007-079194 A | 3/2007 |
| JP | 2008-158418 A | 7/2008 |
| JP | 2008-164725 A | 7/2008 |
| JP | 2009-198722 A | 9/2009 |
| JP | 2009-251114 A | 10/2009 |
| JP | 2010-019959 A | 1/2010 |
| JP | 2011-090186 A | 5/2011 |
| JP | 2011-099924 A | 5/2011 |
| JP | 2011-197302 A | 10/2011 |

OTHER PUBLICATIONS

English Translation of International Preliminary Report on Patentability from International Patent Application No. PCT/JP2013/079240, dated May 14, 2015.

Office Action dated Jun. 6, 2017, in Japanese Patent Application No. 2012-238736.

Examination Report dated Jun. 14, 2018, in Indian Patent Application No. 3669/DELNP/2015.

* cited by examiner

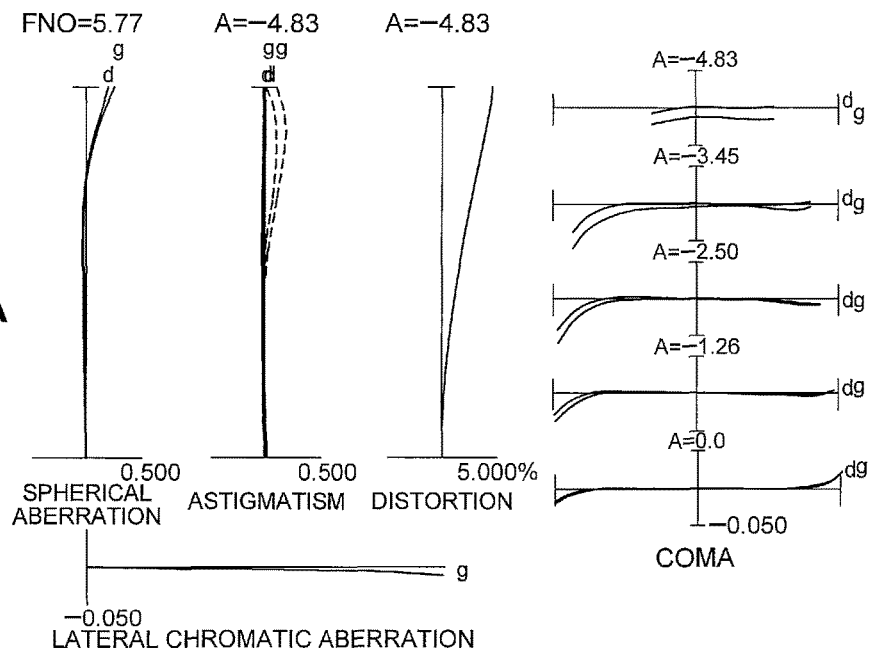
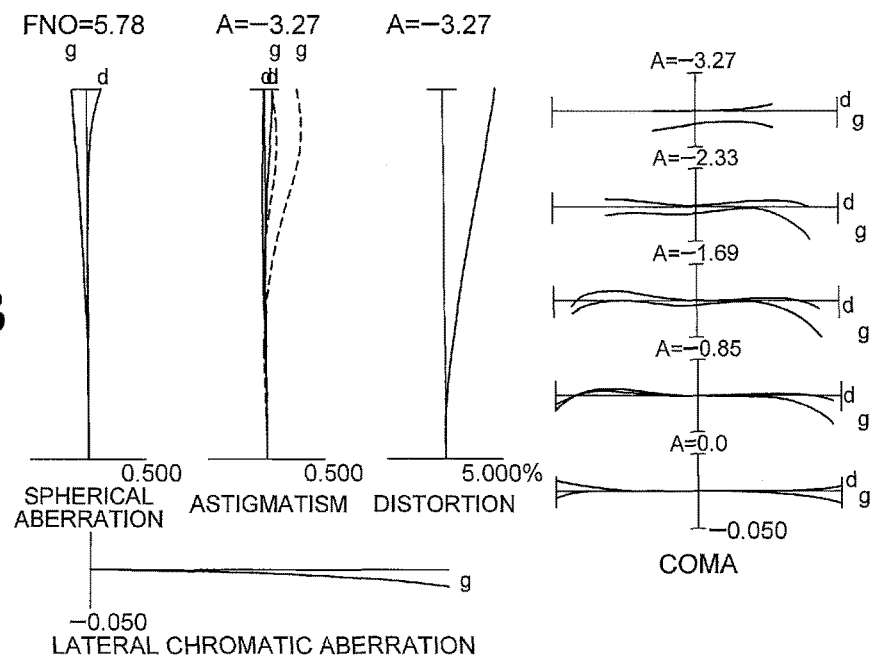

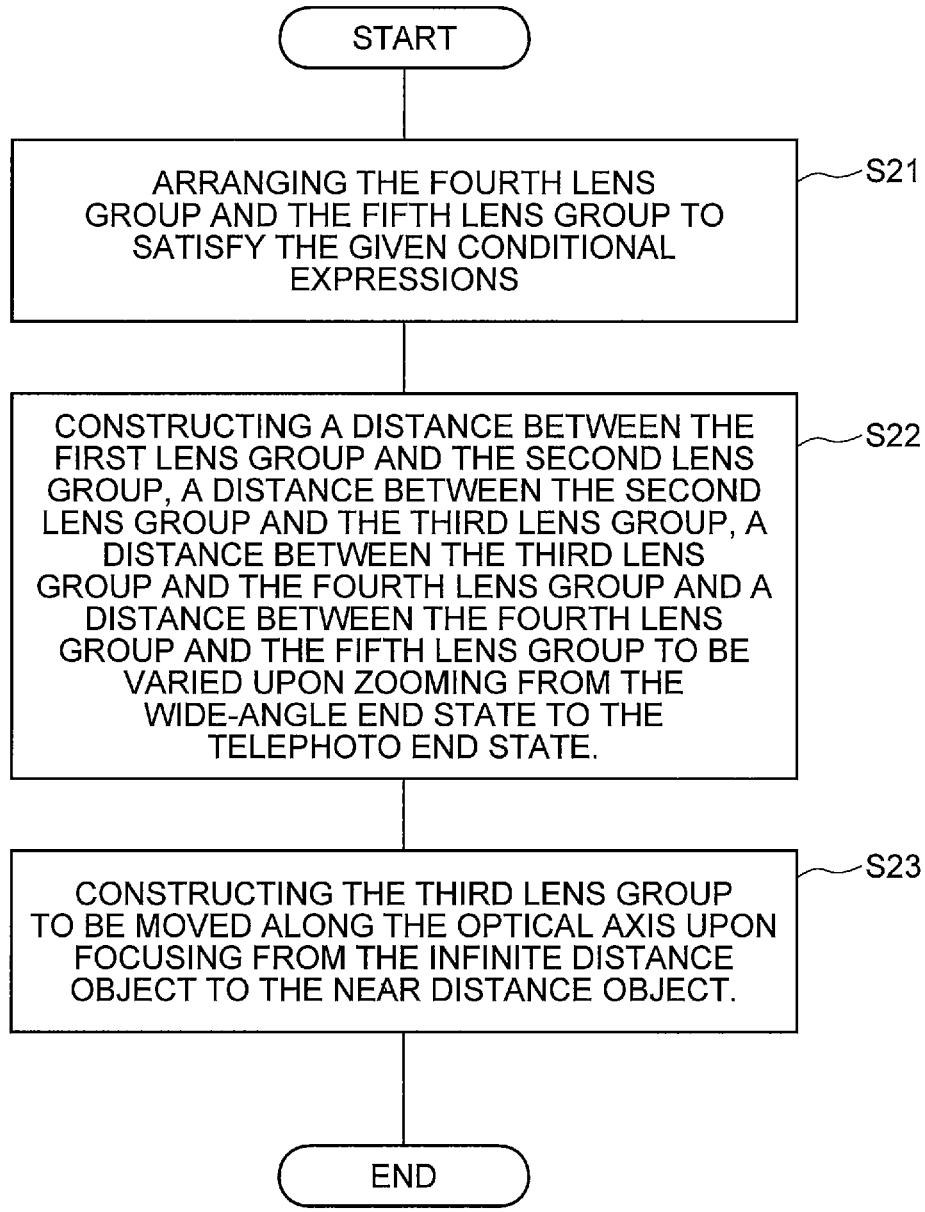

VARIABLE MAGNIFICATION OPTICAL SYSTEM, OPTICAL DEVICE, AND PRODUCTION METHOD FOR VARIABLE MAGNIFICATION OPTICAL SYSTEM

TECHNICAL FIELD

The present invention relates to a variable magnification optical system, an optical device, and a production method for the variable magnification optical system.

BACKGROUND ART

There have been proposed, as a variable magnification optical system suitable for an interchangeable lens for cameras, a digital still camera, a video camera or the like, many variable magnification optical systems which comprise a most object side lens group having positive refractive power. In these variable magnification optical systems, the has been proposed an optical system capable of focusing from an infinite distance object to a near distance obi act for moving a part of lens groups along an optical axis (for example, see Japanese Patent application Laid-Open. No. 2010-19959).

PRIOR ART DOCUMENT

Patent Document

Patent Document 1: Japanese Patent application Laid-Open Gazette No. 2010-19959

SUMMARY OF THE INVENTION

Problems to be Solved by the Invention

However, in the conventional variable magnification optical system as described alcove, there was a problem that it was difficult to conduct downsizing while retaining a high zoom ratio and also attaining a sufficiently excellent, optical performance upon focusing from an infinite distance object to a near distance object.

The present invention is made in view of the above-described problem, and has an object to provide a small-size variable magnification optical system capable of realizing a high zoom ratio and an excellent optical performance upon focusing from an infinite distance object to a near distance object, an optical apparatus, and a method for manufacturing the variable magnification optical system.

Means for Solving the Problem

In order to solve the abovementioned problems, according to the present invention, there is provided a variable magnification optical system comprising, in order from an object side: a first lens group having positive refractive power; a second lens group having negative refractive power; and a third lens group having positive refractive power;

upon zooming from a wide-angle end state to a telephoto end state, a distance between the first lens group and the second lens group, a distance between the second lens group and the third lens group and a distance between the third lens group and an image plane being varied;

on a most image side, a fixed lens group being fixed in a position upon zooming from the wide-angle end state to the telephoto end state; and the third lens group being moved along the optical axis upon focusing from an infinite distance object to a near distance object.

Further, according to the present invention, there is provided a variable magnification optical system comprising, in order from an object side: a first lens group having positive refractive power; a second lens group having negative refractive power; a third lens group having positive refractive power; a fourth lens group having positive refractive power; and a fifth lens group;

upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied;

the third lens group being moved along the optical axis upon focusing on from an in distance obi act to a near distance object; and the following conditional expressions being satisfied:

$$0.220 < f2/ft < 0.500$$

$$-0.010 < (d3t - d3w)/ft < 0.130$$

where it denotes a whole system focal length of the variable magnification optical system in the telephoto and state, f3 denotes a focal length of the third lens group, d3w denotes a distance on the optical axis from a lens surface on a most image side of the third lens group to a lens surface on a most object side of the fourth lens group in the wide-angle end state, and d3t denotes a distance on the optical axis from the lens surface on the most image side of the third lens group to the lens surface on the most object side of the fourth lens group in the telephoto end state.

Further, according to the present invention, there is provided an optical apparatus equipted with the variable magnification optical system.

Further, according to the present invention, there is provided a method for manufacturing a variable magnification optical system comprising, in order from an object side: a first lens group having positive refractive power; a second lens group having negative refractive power; and a third lens group having positive refractive power; the method comprising the steps of:

arranging, upon zooming from a wide-angle end state to a telephoto end state, a distance between the first lens group and the second lens group, distance between the second lens group and the third lens group and a distance between the third lens group and an image plane to be varied;

disposing, on the most image side, a fixed lens group to be fixed in a position upon zooming from the wide-angle end state to the telephoto end state; and constructing the third lens group to be moved along the optical axis upon focusing from an infinite distance object to a near distance object.

Further, according to the present invention, there is provided a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising the stop of:

arranging the third lens group to satisfy the undermentioned conditional expressions;

arranging, upon zooming from the wide-angle end state to the telephoto end state, a distance between the first lens group and the second lens group, a distance between the second lens group and the third lens group, a distance between the third lens group and the fourth lens group and a distance between the fourth lens group and the fifth lens group to be varied; and constructing the third lens group to be moved along the optical axis upon focusing from an infinite distance object to a near distance object:

$$0.220 < f3/ft < 0.500$$

$$-0.010 < (d3t-d3w)/ft < 0.130$$

where ft denotes a whole system focal length of the variable magnification optical system in the telephoto end state, f3 denotes a focal length of the third lens group, d3w denotes a distance on the optical axis from a lens surface on a most image side of the third lens group to a lens surface on a most object side of the fourth lens group in the wide angle end state, and d3t denotes a distance on the optical axis from the lens surface on the most image side of the third lens group to the lens surface on the most object side of the fourth lens group in the telephoto end state.

Effect of the Invention

According to the present invention, there can be provided a small-size variable magnification optical system capable of realizing is high zoom ratio and an excellent optical performance upon focusing from the infinite distance object to the near distance object, an optical apparatus, and a method for manufacturing the variable magnification optical system.

BRIEF DESCRIPTION OF THE DRAWINGS

FIGS. 3A and 3B are graphs showing various aberrations of the variable magnification optical system according to the First Example of the first and second embodiments of the present application upon focusing on the infinite distance object, in the third intermediate focal length state and in the telephoto end state, respectively.

FIG. 23 is a flowchart schematically showing a method for manufacturing the variable magnification optical system according to the second embodiment of the present application.

EMBODIMENTS FOR CARRYING OUT THE INVENTION

Figure 1A:
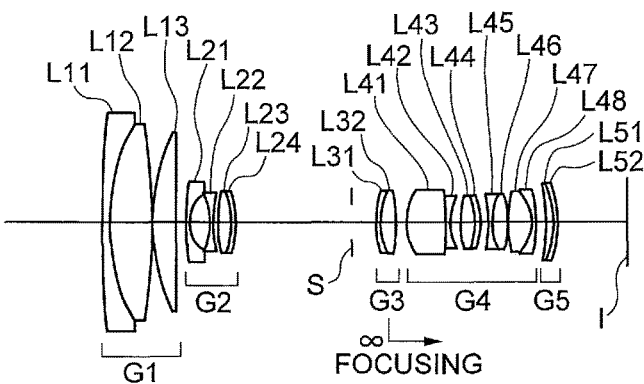
FIGS. 1A, 1B, 1C, 1D and 1E are sectional views showing a variable magnification optical system according to the First. Example of first and second embodiments of the present application, in a wide-angle end state, in a first intermediate focal length state, in a second intermediate focal length state, in a third intermediate focal length state and in a telephoto end state, respectively.
Figure 1B:
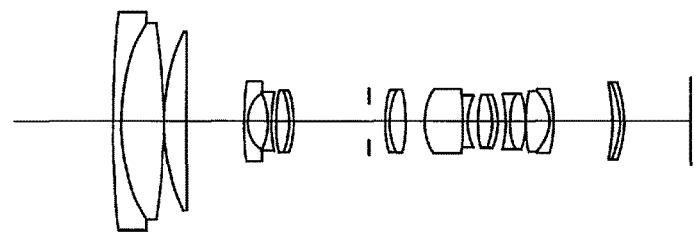
Figure 1C:
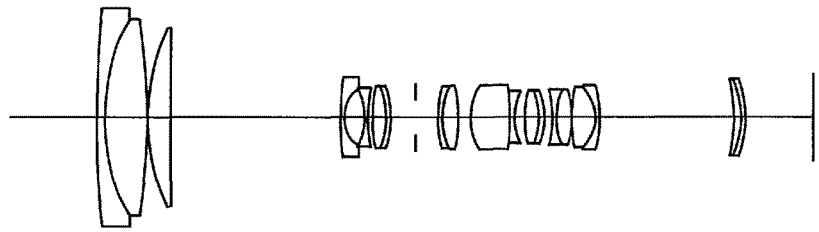
Figure 1D:
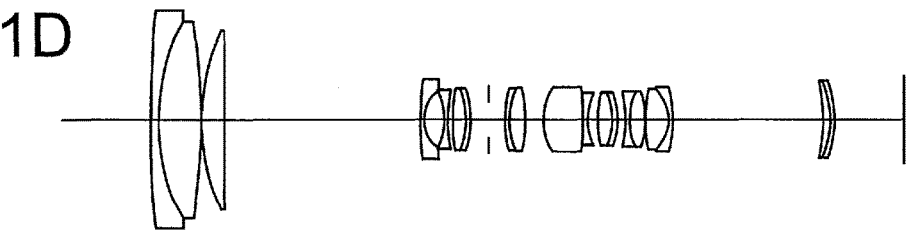
Figure 1E:
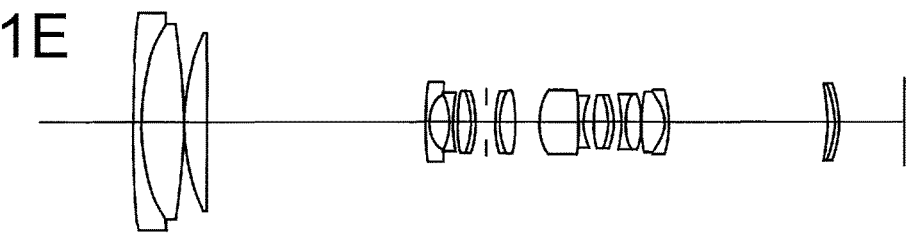

The variable magnification optical system, the optical apparatus and the method for manufacturing the variable magnification optical system according to the first and second embodiments of the present application are explained below.

The variable magnification optical system according to the first embodiment of the present application comprises, in order from an object side: a first lens group having positive refractive power; a second lens group having negative refractive power; and a third lens group having positive refractive power; wherein upon zooming from a wide-angle end state to a telephoto end state, a distance between the first lens group and the second lens group, a distance between the second lens group and the third lens group and a distance between the third lens group and an image plane are varied. With this configuration, the variable magnification optical system of the present application can realize zooming from the wide angle end state to the telephoto end state and suppress respective variations in distortion, astigmatism and spherical aberration, associated with the zooming.

Further, on the most image side, a fixed lens group is fixed in a position upon zooming from the wide-angle end state to the telephoto end state. With this configuration, it is possible to vary a height from the optical axis of marginal light rays made incident on the fixed lens group upon zooming from the wide-angle end state to the telephoto end state and thereby suppress a variation in astigmatism.

Further, the third lens group is configured to be moved along the optical axis upon focusing from an infinite distance object to a near distance object. With this configuration, it is possible to suppress an amount of movement upon zooming in the telephoto side and reduce the total length of the whole optical system, thereby realizing downsizing, and additionally to suppress a variation in height from the optical axis of light rays made incident on the third lens group as a focusing lens group on the telephoto side, thereby suppressing variations in spherical aberration and astigmatism upon focusing.

With the configurations as above-mentioned, it is possible to realize a small-size variable magnification optical system having a high zoom ratio and a high optical performance.

Further, in the variable magnification optical system according to the first embodiment of the present application, it is preferable that the first lens group is moved toward an object side upon zooming from the wide-angle end state to the telephoto end state. With this configuration, it is possible to suppress a variation in height from the optical axis of an off-axis beam passing through the first lens group upon zooming. Consequentivly, it is possible to suppress a variation in astigmatism upon zooming in addition to decrease of a diameter of the first lens group.

Further, in the variable magnification optical system according to the first embodiment of the present application, it is preferable that the following conditional expression (1-1) is satisfied:

$$0.220 < f3/ft < 0.500 \qquad (1\text{-}1)$$

where ft denotes a whole system focal length of the variable magnification optical system in the telephoto end state, and f3 denotes a focal length of the third lens group.

The conditional expression (1-1) defines an adequate range of the focal length of the third lens group. With satisfying the conditional expression (1-1), the variable magnification optical system according to the first embodiment of the present application can suppress variations in spherical aberration and astigmatism upon zooming from the wide-angle end to the telephoto end and upon focusing from the infinite distance object to the near distance object.

In the variable magnification optical system according to the first embodiment of the present application, when the valve of f3/ft is equal to or falls below the lower limit value of the conditional expression (1-1), it becomes difficult to suppress variations in spherical aberration and astigmatism caused in the third lens group upon zooming and upon focusing, so that a high optical performance cannot be realised. Meanwhile, in order to attain the advantageous effect of the present application more surely, it is more preferable to set the lower limit value of the conditional expression (1-1) to 0.242.

On the other hand, in the variable magnification optical system according to the first embodiment of the present application, when the value of f2/ft is equal to or exceeds the upper limit value of the conditional expression (1-1), the amount of movement of the third lens group upon focusing from the infinite distance object to the near distance object becomes large. Consequently, a height from the optical axis of the light rays made incident on the third lens group upon focusing varies largely, so that variations in spherical aberration and astigmatism become large and thereby a high optical performance cannot be realized. Meanwhile, in order to attain the advantageous effect of the present application more surely, it is more preferable to set the higher limit value of the conditional expression (1-1) to 0.358.

Further, in the variable magnification optical system according to the first embodiment of the present application, it is preferable that an intermediate lens group having positive refractive power is disposed between the third lens group and the fixed lens group. In the variable magnification optical system of the present invention, the intermediate lens group disposed between the third lens group and the fixed lens group has positive refractive power. Accordingly, it is possible to relatively lengthen to focal length of the third lens group, so that variations in spherical aberration and astigmatism caused in the third lens group upon zooming can be suppressed.

Further, in the variable magnification optical system according to the first embodiment of the Present application, it is preferable that the following conditional expression (1-2) is satisfied:

$$-0.010<(d3t-d3w)/f<0.130 \tag{1-2}$$

where ft denotes the whole system focal length of the variable magnification optical system in the telephoto end state, d3w denotes a distance on the optical axis from a lens surface on a most image side of the third lens group to a lens surface on a most object side of the intermediate lens group in the wide-angle end state, and d3t denotes a distance on the optical axis from the lens surface on the most image side of the third lens group to the lens surface on the most object side of the intermediate lens group in the telephoto end state.

The conditional expression (1-2) defines an adequate range of the distance on the optical axis from the lens surface on the most image side of the third lens group to the lens surface on the most object side of the intermediate lens group upon zooming from the wide-angle end state to the telephoto end state. With satisfying the conditional expression (1-2), the variable magnification optical system according to the first embodiment of the present application can suppress variations in coma aberration and astigmatism upon zooming.

In the variable magnification optical system according to the first embodiment of the present application, when the value of (d3t−d3w)/ft is equal to or falls below the lower limit value of the conditional expression (1-2), it becomes difficult to suppress a variation in astigmatism caused in the third lens group upon zooming, so that a high optical performance cannot be realized. Meanwhile, in order to attain the advantageous effect of the present application more surely, it is more preferable to set the lower limit value of the conditional expression (1-2) to 0.000.

On the other hand, in the variable magnification optical system according to the first embodiment of the present application, when the value of (d3t−d3w)/ft is equal to or exceeds the upper limit value of the conditional expression (1-2), it becomes difficult to suppress a variation in coma aberration caused in the intermediate lens group upon zooming, so that a high optical performance cannot be realized. Meanwhile, in order to attain the advantageous effect of the present application more surely, it is more preferable to set the upper limit value of the conditional expression (1-2) to 0.065. Further, in order to attain the advantageous effect of the present application still more surely, it is still more preferable to set the upper limit, value of the conditional expression (1-2) to 0.035.

Further, in the variable magnification optical system according to the first embodiment of the present application, it is preferable that only the intermediate lens group is disposed between the third lens group and the fixed lens group. In the variable magnification optical system of the present invention, by arranging only the intermediate lens group between the third lens group and the fixed lens group, it is possible to reduce the number of groups of the whole variable magnification optical system and thereby subpress decentering coma aberration due to eccentricity among the lens groups during manufacturing to be relatively small, so that an optical system having a high optical performance can be provided.

Further, in the variable magnification optical system according to the first embodiment of the present application, it is preferable that the following conditional expression (1-3) is satisfied:

$$0.410<f3/fim<1.000 \tag{1-3}$$

where f3 denotes the focal length of the third lens group, and fim denotes a focal length of the intermediate lens group.

The conditional expression. (1-3) defines an adequate range of a ratio of the focal length of the third lens group to that of the intermediate lens group. With satisfying the conditional expression (1-3), the variable magnification optical system according to the first embodiment of the present application can suppress variations in spherical aberration and astigmatism upon zooming.

In the variable magnification optical system according to the first embodiment of the present application, when the value of f3/fim is equal to or falls below the lower limit value of the conditional expression (1-3), it becomes difficult to suppress variations in spherical aberration and astigmatism caused in the third lens group upon zooming, so that a high optical performance cannot be realized. Meanwhile, in order to attain the advantageous effect of the present application more surely, it is more preferable to set the lower limit value of the conditional expression (1-3) to 0.550.

On the other hand, in the variable magnification optical system according to the first embodiment of the present application, when the value of f3/fim is equal to or exceeds the upper limit value of the conditional expression (1-3), it becomes difficult to suppress variations in spherical aberration and astigmatism caused in the intermediate lens group upon zooming, so that a high optical performance cannot be realized. Meanwhile, in order to attain the advantageous effect of the present application more surely, it is more preferable to set the higher limit value of the conditional expression (1-3) to 0.880.

Further, in the variable magnification optical system according to the first embodiment of the present application, it is preferable that a distance between the intermediate lens group and the fixed lens group is increased upon zooming from the wide-angle end state to the telephoto end state. In the variable magnification optical system of the present application, by increasing the distance between the intermediate lens group and the fixed lens group upon zooming from the wide-angle end state to the telephoto end state, it is possible to increase a composite magnification of the intermediate lens group and the fixed lens group larger, so that variations in spherical aberration and astigmatism upon zooming can be suppressed while realizing a high zoom ratio effectively.

Further, in the variable magnification optical system according to the first embodiment of the present application, it is preferable that a distance between the first lens group and the second lens group is increased upon zooming from the wide-angle end state to the telephoto end state. With this configuration, it is possible to increase a magnification of the second lens group larger, so that variations in spherical aberration and astigmatism upon zooming can be suppressed while realizing a high zoom ratio effectively.

Further, in the variable magnification optical system according to the first embodiment of the present application, it is preferable that a distance between the second lens group and the third lens group is decreased upon zooming from the wide-angle end state to the telephoto end state with this configuration, it is possible to make a composite magnification of the third lens group and the subsequent lens group larger, so that variations in spherical aberration and astigmatism upon zooming can be suppressed while realizing a high zoom ratio effectively.

Further, in the variable magnification optical system according to the first embodiment of the present application, it is preferable that a distance between the third lens group and the image plane is increased upon zooming from the wide-angle end state to the telephoto end state. In the variable magnification optical system according to the first embodiment of the present application, by increasing the distance between the third lens group and the image plane upon zooming, it is possible to make a composite magnification of the third lens group and the subsequent lens group larger, so that variations in spherical aberration and astigmatism upon zooming can be suppressed while realizing a high zoom ratio effectively.

Further, in the variable magnification optical system according to the first embodiment of the present application, it is preferable that the fixed lens group has positive refractive power. In the variable magnification optical system according to the first embodiment of the present invention, the intermediate lens group has positive refractive and thereby a usable magnification of the fixed lens group becomes smaller than an equi-magnification. As a result, in the variable magnification optical system of the present application, it is possible to relatively lengthen a composite focal length of lens groups disposed to the object side of the fixed lens group, so that decentering coma aberration and the like due to eccentricity among the lenses of the lens groups disposed to the object side of the fixed lens group during manufacturing can be suppressed to be relatively small and thereby a high optical performance can be realized.

Further, in the variable magnification optical system according to the first embodiment of the present application, it is preferable that the third lens group is moved toward the image side upon focusing on from the infinite distance object to the near distance object. In the variable magnification optical system according to the first embodiment of the present application, by moving the third lens group toward the image side upon focusing, it is possible to excellently conduct focusing from the infinite distance object to the near distance object.

An optical apparatus according to the first embodiment of the present application comprises the variable magnification optical system having the above described configuration. By such configuration, it is possible to realize a small-size optical apparatus having a high zoom ratio and a high critical performance.

In a method for manufacturing a variable magnification optical system according to the first embodiment of the present application, the variable magnification optical system comprises, in order from an object side: a first lens group having positive refractive power; a second lens group having negative refractive power; and a third lens group having positive refractive power. The method comprises the steps of: arranging, upon zooming from a wide-angle end state to a telephoto end state, a distance between the first lens group and the second lens group, a distance between the second lens group and the third lens group and a distance between the third lens group and an image plane to be varied; disposing, on the most image side, a fixed lens group to be fixed in a position upon zooming from the wide-angle end state to the telephoto end state; constructing the third lens group to be moved along the optical axis upon focusing from an infinite distance object to a near distance object.

Next, the variable magnification optical system according to the second embodiment of the present application is explained below. The variable magnification optical system according to the second embodiment of the present application comprises, in order from an object side: a first lens group having positive refractive power; a second lens group having negative refractive power; a third lens group having positive refractive power; a fourth lens group having positive refractive power; and a fifth lens group; wherein upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied. With this configuration, the variable magnification optical system of the present application can realize zooming from the wide-angle end state to the telephoto end state, and suppress respective variations in distortion, astigmatism and spherical aberration, associated with the zooming.

Further, the third lens group is configured to be moved along the optical axis upon focusing on from an infinite distance object to sneer distance object. With this configuration, it is possible to suppress an amount of movement upon zooming on the telephoto side and reduce the total length of the whole optical system, thereby realizing downsizing, and additionally to suppress a variation in height from the optical axis of light rays made incident, on the third lens group as a focusing lens group on the telephoto side, thereby suppressing variations in spherical aberration and astigmatism upon focusing.

Further, in the variable magnification optical system according to the second embodiment of the present application, the following conditional expressions (2-1) and (2-2) are satisfied:

$$0.220 < f3/ft < 0.500 \tag{2-1}$$

$$-0.010 < (d3t - d3w)/ft < 0.130 \tag{2-2}$$

where ft denotes a whole system focal length of the variable magnification optical system in the telephoto end state, f3 denotes a focal length of the third lens group, d3w denotes a distance on the optical axis from a lens surface on a most image side of the third lens group to a lens surface on a most object side of the fourth lens group in the wide angle end state, and d3t denotes a distance on the optical axis from the lens surface on the most image side of the third lens group to the lens surface on the most object side of the fourth lens group in the telephoto end state.

The conditional expression. (2-1) defines an adequate range of the focal length of the third lens group. With satisfying the conditional expression (2-1), the variable magnification optical system according to the second embodiment of the present application can suppress variations in spherical aberration and astigmatism upon zooming from the wide-angle end state to the telephoto end state and upon focusing from an infinite distance object to ta near distance object.

In the variable magnification optical system according to the second embodiment of the present application, when the value of f3/ft is equal to or falls below the lower limit value of the conditional expression (2-1), it becomes difficult to suppress variatians in spherical aberration and astigmatism caused in the third lens group upon zooming and upon focusing, so that a high optical performance cannot be realized. Meanwhile, in order to attain the advantageous effect of the present application more surely, it is more preferable to set the lower limit value of the conditional expression (2-1) to 0.242.

On the other hand, in the variable magnification optical system according to the second embodiment of the present application, when the value of f3/ft is equal to or exceeds the upper limit value of the conditional expression (2-1), the amount of movement of the third lens group upon focusing from the infinite distance object to the near distance object becomes large. Consequently, a height from the optical axis of the light rays made incident on the third lens group upon focusing varies largely, so that variations in spherical aberration and astigmatism become large and thereby a high optical performance cannot be realized. Meanwhile, in order to attain the advantageous effect of the present application more surely, it is more preferable to set the upper limit value of the conditional expression (2-1) to 0.335.

The conditional expression (2-2) defines an adequate range of the distance on the optical axis from the lens surface on the most image side of the third lens group to the lens surface on the most object side of the fourth lens group upon zooming from the wide-angle end state to the telephoto end state. With satisfying the conditional expression (2-2), the variable magnification optical system according to the second embodiment of the present application can suppress variations in coma aberration and as upon zooming.

In the variable magnification optical system according to the second embodiment of the present application, when the value of (d3t−d3w)/ft is equal to or falls below the lower limit value of the conditional expression (2-2), it becomes difficult to suppress a variation in astigmatism caused in the third lens group upon zooming, so that a high optical performance cannot be realized. Meanwhile, in order to attain the advantageous effect of the present application more surely, it is more preferable to set the lower limit value of the conditional, expression (2-2) to 0.000.

On the other hand, in the variable magnification optical system according to the second embodiment of the present application, when the value of (d3t−d3w)/ft is equal to or exceeds the upper limit value of the conditional expression (2-2), it becomes difficult to suppress a variation in coma aberration caused in the fourth lens group upon zooming, so that a high optical performance cannot be realized. Meanwhile, in order to attain the advantageous effect of the present application more surely, it is more preferable to set the upper limit value of the conditional expression (2-2) to 0.065. Further, in order to attain the advantageous effect of the present application still more surely, it is still more preferable to set the upper limit value of the conditional expression (2-2) to 0.05.

By such configuration, it is possible to realize a small-size variable magnification optical system having a high zoom ratio and a high optical performance.

Further, in the variable magnification optical system according to the second embodiment of the present application, it is preferable that the first lens group is moved toward the object side upon zooming from the wide-angle end state to the telephoto end state. With this configuration, it is possible to suppress a variation in height from the optical axis of an off-axis beam passing through the first, lens group upon zooming. Consequently, it is possible to suppress a variation in astigmatism upon zooming in addition to decrease of a diameter of the first, lens group.

Further, in the variable magnification optical system according to the second embodiment of the present application, it is preferable that the following conditional expression (2-3) is satisfied:

$$-1,240 < f2/fw < -0.650 \qquad (2\text{-}3)$$

where fw denotes a whole system focal length of the variable magnification optical system in the wide-angle end state, and f2 denotes a focal length of the second lens group.

The conditional expression. (2-3) defines an adequate range of the focal length of the second lens group. With satisfying the conditional expression (2-3), the variable magnification optical system according to the second embodiment of the present application can suppress variations in spherical aberration and astigmatism upon zooming.

In the variable magnification optical system according to the second embodiment of the present application, when the value of f2/fw is equal to or falls below the lower limit value of the conditional expression (2-3), it becomes necessary to increase an amount of variation in distance between the first lens group and the second lens group upon zooming so as to obtain a predetermined zoom ratio. For this reason, it becomes difficult to realize downsizing, and in addition, since a variation in height from the optical is of the off-axis beam made incident on the second lens group from the first lens group varies largely associated with zooming to thereby cause an excessive variation in astigmatism, a high optical performance cannot be realized. Meanwhile, in order to attain the advantageous effect of the present application more surely it is more preferable to set the lower limit value of the conditional expression (2-3) to −1.180. Further, in order to attain the advantageous effect of the present application still more surely, it is still more preferable to set the lower limit value of the conditional expression (2-3) to −1.145.

On the other hand, in the variable magnification optical system according to the second embodiment of the present application, when the value of f2/fw is equal to or exceeds the higher limit, value of the conditional expression (2-3), it becomes difficult to suppress variations in spherical aberration and astigmatism caused in the second lens group upon zooming, so that a high optical performance cannot be realized. Meanwhile, in order to attain the advantageous effect of the present application more surely it is more preferable to set the upper limit value of the conditional expression (2-3) to −0.760.

Further, in the variable magnification optical system according to the second embodiment of the present application, it is preferable that the following conditional expression (2-4) is satisfied:

$$0.410 < f3/f4 < 1.000 \qquad (2\text{-}4)$$

where f3 denotes the focal length of the third lens group, and F4 denotes a focal length of the fourth lens group.

The conditional expression (2-4) defines an adequate range of a ratio of the focal length of the third lens group to that of the fourth lens group. With satisfying the conditional expression (2-4), the variable magnification optical system according to the second embodiment of the present application can suppress variations in spherical aberration and astigmatism upon zooming.

In the variable magnification optical system according to the second embodiment of the present application, when the value of F3/f4 is equal to or falls below the lower limit value of the conditional expression (2-4), it becomes difficult to suppress variations in spherical aberration and astigmatism caused in the third lens group upon zooming, so that a high optical performance cannot be realized. Meanwhile, in order to attain the advantageous effect of the present application more surely, it is more preferable to set the lower limit value of the conditional expression (2-4) to 0.550.

On the other hand, in the variable magnification optical system according to the second embodiment of the present application, when the value of f3/f4 is equal to or exceeds the upper limit value of the conditional expression (2-4), it becomes difficult to suppress variations in spherical aberration and astigmatism caused in the fourth lens group upon zooming, so that a high optical performance cannot be realized. Meanwhile, in order to attain the advantageous effect of the present application more surely, it is more preferable to set the upper limit value of the conditional expression (2-4) to 0.880.

Further, in the variable magnification optical system according to the second embodiment of the present application, it is preferable that the fifth lens group is fixed in a position upon zooming from the wide-angle end state to the telephoto end state. With this configuration, it is possible to vary a height from the optical axis of marginal light rays made incident on the fifth lens group from the fourth lens group upon zooming and thereby excellently suppress a variation in astigmatism upon zooming.

Further, in the variable magnification optical system according to the second embodiment of the present application, it is preferable that a distance between the first lens group and the second lens group is increased upon zooming from the wide-angle end state to the telephoto end state with this configuration, it is possible to make a magnification of the second lens group larger, so that variations in spherical aberration and astigmatism upon zooming can be suppressed while realizing a high zoom, ratio effectively.

Further, in the variable magnification optical system according to the second embodiment of the present application, it is preferable that a distance between the second lens group and the third lens group is decreased upon zooming from the wide-angle end state to the telephoto end state. With this configuration, it is possible to make a composite magnification of the third lens group and the subsequent lens group larger, so that variations in spherical aberration and astigmatism upon zooming can be suppressed while realizing a high zoom ratio effectively.

Further, in the variable magnification optical system according to the second embodiment of the present application, it is preferable that a distance between the fourth lens group and the fifth lens group is increased upon zooming from the wide-angle end state to the telephoto end state. With this configuration, it is possible to make a composite magnification of the third lens group and the fourth lens group larger, so that variations in spherical aberration and astigmatism upon zooming can be suppressed while realizing a high zoom ratio effectively.

Further, in the variable magnification optical system according to the second embodiment of the present application, it is preferable that the fifth lens group has positive refractive lower. In the variable magnification optical system of the present invention, when the fifth lens group has positive refractive, a usable magnification of the firth lens group becomes smaller than an equi-magnification. As a result, it is possible to relatively lengthen a composite focal length of the first to fourth lens groups, so that influence such as decentering coma aberration due to eccentricity among the lenses of the lens groups disposed between the first lens group and the fourth lens group during manufacturing can be suppressed to be relatively small and thereby a high optical performance can be provided.

Further, in the variable magnification optical system according to the second embodiment of the present application, it is preferable that the third lens group is moved toward the image side upon focusing from the infinite distance object to the near distance object. In the variable magnification optical system according to the second embodiment of the present application, by moving the third lens group toward the image side upon focusing, it is possible to excellently conduct focusing on from the infinite distance object to the near distance object.

An optical apparatus according to the second embodiment of the present application comprises the variable magnification optical system having the above-described configuration. By such configuration, it is possible to realize a small-size optical apparatus having a high zoom ratio and a high optical performance.

In a method for manufacturing a variable magnification optical system according to the second embodiment of the present application, the variable magnification optical system comprises, in order from an object side: a first lens group having positive refractive power; a second lens group having negative refractive power; a third lens group having positive refractive power; a fourth lens group having positive refractive power; and a fifth lens group. The method comprises the steps of: arranging the fourth and fifth lens groups to satisfy the undermentioned conditional expressions (2-1) and (2-2); arranging, upon zooming from the wide-angle end state to the telephoto end state, a distance between the first lens group and the second lens group, a distance between the second lens group and the third lens group, a distance between the third lens group and the fourth lens group and a distance between the fourth lens group and the fifth lens group to be varied; and constructing the third lens group to be moved along the optical axis upon focusing from an infinite distance object to a near distance object:

$$0.220 < f3/ft < 0.500 \qquad (2\text{-}1)$$

$$-0.010 < (d3t - d3w)/ft < 0.130 \qquad (2\text{-}2)$$

where ft denotes a whole system focal length of the variable magnification optical system in the telephoto end state, f3 denotes a focal length of the third lens group, d3w denotes a distance on the optical axis from a lens surface on a most image side of the third lens group to a lens surface on a most object side of the fourth lens ground in the wide angle end state, and d3t denotes a distance on the optical axis from the lens surface in the most image side of the third lens group to the lens surface on the most object side of the fourth lens group in the telephoto end state.

Hereinafter, variable magnification optical systems relating to numerical examples according to the first and second embodiments of the present application will be explained with reference to the accompanying drawings.

First Example

FIGS. 1A, 1F, 1C, 1D and 1E are sectional views showing a variable magnification optical system according to the First Example of the first and second embodiments of the present application, in a wide-angle end state, in a first intermediate focal length state, in a second intermediate focal length state, in a third intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power as an intermediate lens group, and a fifth lens group G5 having positive refractive power as a fixed lens group.

The first lens groom G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a negative meniscus lens L24 having a concave surface facing the object side. Meanwhile, the negative meniscus lens L21 is a glass mold type aspherical lens of which a lens surface on the object side is formed into: an aspherical shape.

The third lens group G3 consists of, in order from the obi act side, a cemented lens constructed by a negative meniscus lens L31 having a convex surface facing the object side cemented with a double convex positive lens L32. Meanwhile, an aperture stop S is disposed on the object side, of the third lens group G3.

The fourth lens group G4 consists of, in order from the object side, a cemented lens constructed by a double convex positive lens L41 cemented with double concave negative lens L42, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Meanwhile, the negative meniscus lens L48 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon zooming from the wide-angle end state to the telephoto end state, the first lens group G1 to the fourth lens group G4 are moved along the optical axis such that a distance between the first lens group G1 and the second lens group G2, a distance between the second lens group G2 and the third lens croon G3, a distance between the third lens group G3 and the fourth lens group G4 and a distance between the fourth lens group G4 and the fifth lens group G5 are varied, respectively.

To be specific, the first lens group G1, the third lens group G3 and the fourth lens group G4 are moved toward the object side upon zooming. The second lens group G2 is moved toward the object side from the wide-angle end state to the third intermediate focal length state and it is moved toward the image side from the third intermediate focal length state to the telephoto end state. The fifth lens group G5 is fixed in a position in the direction of the optical axis upon zooming. Meanwhile, the aperture stop S is moved integrally with the fourth lens group G4 upon zooming.

Further, focusing from the infinite distance object to the near distance object is conducted by moving the third lens group G3 toward a side of an image plane I along the optical axis.

Consequently, upon zooming, the distance between the first hens group G1 and the second lens group G2 is increased, the distance between the second lens group G2 and the third lens group G3 is decreased, and the distance between the fourth lens group G4 and the fifth lens group G5 is increased. The distance between the third lens group G3 and the fourth lens group G4 is increased from the wide-angle end state to the first intermediate focal lengh state, it is decreased from the first intermediate focal length state to the second intermediate focal length state, and it is increased from the second intermediate focal length state to the telephoto end state. Meanwhile, upon zooming, a distance between the aperture stop S and the third lens group G3 is decreased from the wide-angle end state to the first intermediate focal length state, it is increased from the first intermediate focal length state to the second intermediate focal length state, and it is decreased from the second intermediate focal length state to the telephoto end state.

Table 1 below shows various values of the variable magnification optical system according to the present Example.

In Table 1, f denotes a focal length, and BS denotes a beck focal length (a distance on the optical axis between the most image side lens surface and the image plane I).

In {Surface Data}, m denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength. $\lambda$=587.6 nm) and vd denotes an Abbe number for d-line (wavelength $\lambda$=587.6 nm). Further, OP denotes an object surface, S denotes an aperture stop, and I denotes an image plane. Meanwhile, a radius of curvature r=∞denotes a plane surface. As for an aspherical surface, "*" is attached to the surface number and a value of a paraxial radius of curvature is indicated in the column of the radius of curvature r. Refractive index of air nd=1.000000 is omitted in the description.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+[1-\kappa(h/r)^2]^{1/2}]+A4h^4+A6h^6+A6h^8+A10h^{10}+A12h^{12}$$

where h denotes a vertical height from the optical axis, a denotes a distance in the direction of the optical axis from the tangent surface at the vertex of the aspherical surface to the aspherical surface at the vertical height from the optical axis (a sag amount), a denotes a conical coefficient, A4, A6, A8, A10 and A12 denote respective aspherical coefficients, and r denotes a radius of curvature of a reference enters (a paraxial radius of curvature). "E–n", where n is an integer denotes "×10$^{-n}$", for example, "1.234E-05" denotes "1.234× 10$^{-5}$". The 2nd order aspherical surface coefficient A2 is 0, and omitted in the description.

In [Various Data], FNO denotes en F-number, ω denotes a half angle of view (unit "°"), Y denotes an image height, TL denotes a total length of the variable magnification optical system (a distance on the optical axis from the first surface to the image miens I upon focusing on the infinite distance object), dn denotes a variable interval between an n-th surface and an (n+1)-th surface and φ denotes a diameter of the aperture stop S. Meanwhile, W denotes the wide-angle end state, M1 denotes the first intermediate focal length state, M2 denotes the second intermediate focal length state, M3 denotes the third intermediate focal length state, and T denotes the telephoto end state.

[Focusing Group Movement Amount Upon Focusing] shows an amount of movement of the focusing lens group. (the third lens group) from the infinite distance focusing state to the near distance focusing state (shooting magnification-0.0100). It is noted, here, that regarding the movement direction of the focusing lens, movement to the image side is positive. In addition, a shooting distance is a distance from the object to the image plane.

In [Lens Group Data], a starting surface ST and a focal length t are shown for each lens group.

In [Values fox Conditional Expressions], values corresponding to respective conditional expressions in the variable magnification optical system according to the present Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

The above-mentioned reference symbols in Table 1 are also employed in the same manner in Tables of the after-mentioned Examples.

TABLE 1

First Example

[Surface Data]

| m | r | d | nd | vd |
|---|---|---|---|---|
| OP | ∞ | | | |
| 1 | 165.4019 | 1.6350 | 1.902650 | 35.73 |
| 2 | 41.8893 | 9.2560 | 1.497820 | 82.57 |
| 3 | −178.4364 | 0.1000 | | |
| 4 | 42.8430 | 5.1140 | 1.729160 | 54.61 |
| 5 | 515.0653 | d5 | | |
| *6 | 500.0000 | 1.0000 | 1.851350 | 40.10 |
| 7 | 9.0059 | 4.2479 | | |
| 8 | −16.6413 | 1.0000 | 1.883000 | 40.66 |
| 9 | 50.8442 | 0.7538 | | |
| 10 | 32.1419 | 3.0566 | 1.808090 | 22.74 |
| 11 | −18.1056 | 1.0000 | 1.883000 | 40.66 |
| 12 | −29.3627 | d12 | | |
| 13 | ∞ | d13 | | Aperture Stop S |
| 14 | 27.1583 | 1.0000 | 1.883000 | 40.66 |
| 15 | 14.3033 | 3.4259 | 1.593190 | 67.90 |
| 16 | −43.0421 | d16 | | |
| 17 | 12.5000 | 8.2427 | 1.670030 | 47.14 |
| 18 | −79.2339 | 1.0000 | 1.883000 | 40.66 |
| 19 | 11.4345 | 2.0000 | | |
| 20 | 18.9834 | 3.3397 | 1.518600 | 69.89 |
| 21 | −12.4126 | 1.0000 | 1.850260 | 32.35 |
| 22 | −22.7118 | 1.5000 | | |
| 23 | −46.2616 | 1.0000 | 1.902650 | 35.73 |
| 24 | 11.4391 | 3.5033 | 1.581440 | 40.98 |
| 25 | −30.7870 | 0.1000 | | |
| 26 | 28.7953 | 5.0986 | 1.581440 | 40.98 |
| 27 | −8.8012 | 1.0000 | 1.820800 | 42.71 |
| *28 | −35.2149 | d28 | | |
| 29 | −40.0000 | 1.6432 | 1.497820 | 82.57 |
| 30 | −19.4318 | 1.0000 | 1.834410 | 37.28 |
| *31 | −22.7996 | BF | | |
| I | ∞ | | | |

[Aspherical Data]

| m | 6 | 28 | 31 |
|---|---|---|---|
| κ | 11.00000 | 1.0000 | 1.00000 |
| A4 | 3.95289E−05 | −5.59168E−05 | 2.65930E−05 |
| A6 | −2.04622E−07 | −2.20298E−07 | 7.69228E−08 |
| A8 | −4.81392E−09 | 3.87818E−10 | −1.34346E−09 |
| A10 | 9.83575E−11 | 1.16318E−11 | 0.00000 |
| A12 | −5.88880E−13 | 0.00000 | 0.00000 |

TABLE 1-continued

First Example

[Various Data]

zoom ratio 14.14

|  |  | W |  | T |
|---|---|---|---|---|
|  | f | 9.47 | ~ | 133.87 |
|  | FNO | 4.12 | ~ | 5.78 |
|  | ω | 41.95 | ~ | 3.27° |
|  | Y | 8.00 | ~ | 8.00 |
|  | TL | 112.25 | ~ | 165.65 |

|  | W | M1 | M2 | M3 | T |
|---|---|---|---|---|---|
| f | 9.47002 | 17.83631 | 60.50026 | 90.50043 | 133.87072 |
| ω | 41.95497 | 23.18274 | 7.18201 | 4.82759 | 3.26779 |
| FNO | 4.12 | 5.24 | 5.77 | 5.77 | 5.78 |
| φ | 8.52 | 8.52 | 9.55 | 10.30 | 11.04 |
| d5 | 2.10000 | 12.15693 | 36.10717 | 41.77210 | 46.27797 |
| d12 | 24.77744 | 16.39929 | 5.66327 | 3.74451 | 2.20000 |
| d13 | 5.18928 | 3.23115 | 4.53928 | 3.63928 | 1.80000 |
| d16 | 2.25000 | 4.20813 | 2.90000 | 3.80000 | 5.63928 |
| d28 | 1.86861 | 12.02032 | 28.59900 | 32.29005 | 33.66620 |
| BF | 14.04947 | 14.04956 | 14.04999 | 14.04993 | 14.05005 |

[Focusing Group Movement Amount Upon Focusing]

|  | W | M1 | M2 | M3 | T |
|---|---|---|---|---|---|
| shooting magnification | −0.0100 | −0.0100 | −0.0100 | −0.0100 | −0.0100 |
| shooting distance | 919.8426 | 1738.0661 | 5883.2483 | 8797.7469 | 12999.8339 |
| movement amount | 0.1898 | 0.1340 | 0.1875 | 0.2426 | 0.3440 |

[Lens Group Data]

|  | ST | f |
|---|---|---|
| G1 | 1 | 68.08250 |
| G2 | 6 | −9.98760 |
| G3 | 14 | 38.80284 |
| G4 | 17 | 60.78065 |
| G5 | 29 | 129.99998 |

[Values for Conditional Expressions]

| (1-1) | f3/ft = 0.290 |
|---|---|
| (1-2) | (d3t − d3w)/ft = 0.025 |
| (1-3) | f3/fim = 0.638 (fim = f4) |
| (2-1) | f3/ft = 0.290 |
| (2-2) | (d3t − d3w)/ft = 0.025 |
| (2-3) | f2/fw = −1.055 |
| (2-4) | f3/f4 = 0.638 |

Figure 2A:
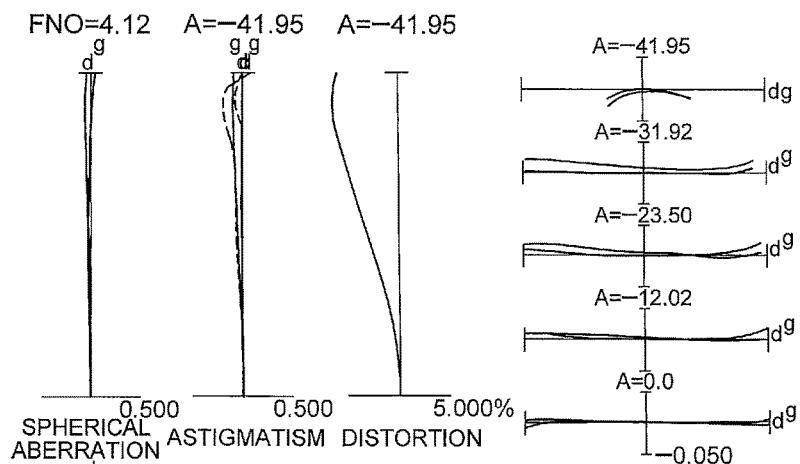
FIGS. 2A, 2B and 2C are graphs showing various aberrations of the variable magnification optical system according to the First Example of the first and second embodiments of the present application upon focusing on an infinite distance object, in the wide-angle end state, in the first intermediate focal length state, and in the second intermediate focal length state, respectively.
Figure 2B:
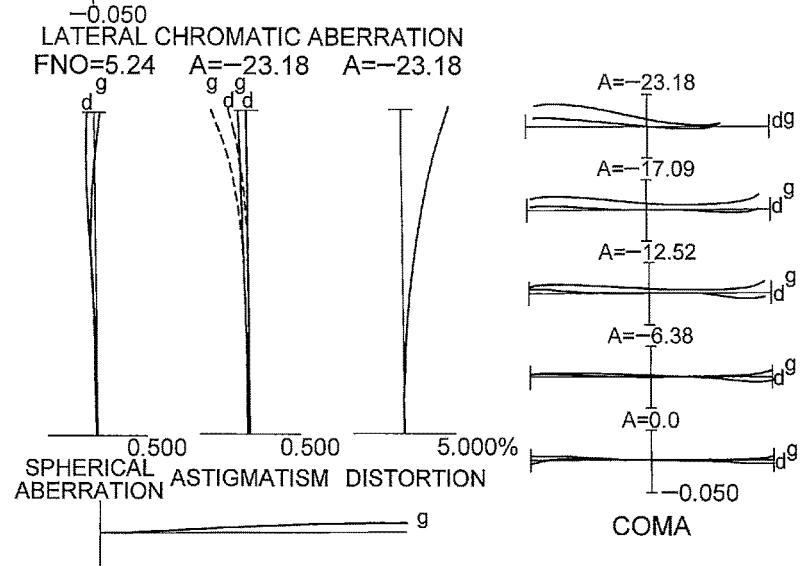
Figure 2C:
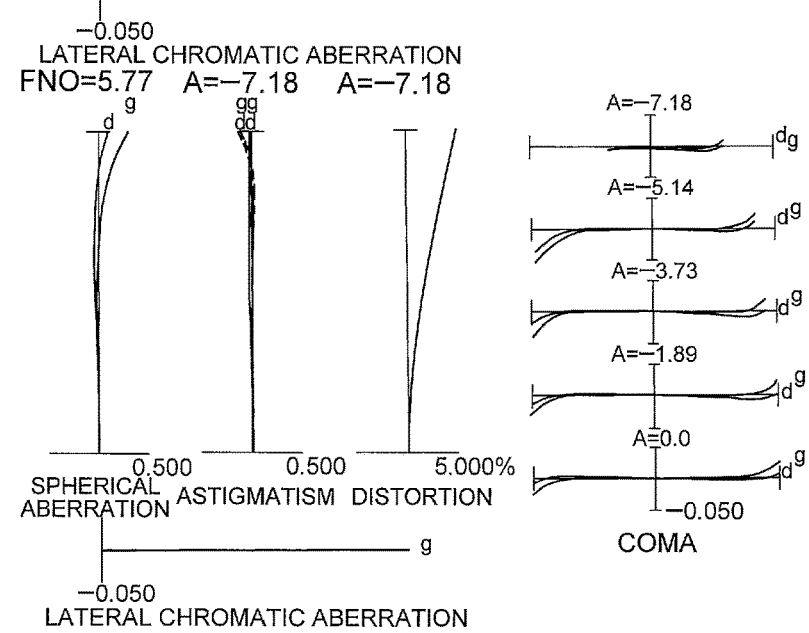

FIGS. 1A, 2B, and 2C are graphs showing various aberrations of the variable magnification optical system according to the First Example of the first and second embodiments of the present application upon focusing on an infinite distance object, in the wide-angle end state, in the first intermediate focal length state, and in the second intermediate focal length state, respectively.

FIGS. 3A and 3B are graphs showing various aberrations of the variable magnification optical system according to the First Example of the first and second embodiments or the present application upon focusing on the infinite distance object, in the third intermediate focal length state and in the telephoto end state, respectively.

Figure 4A:
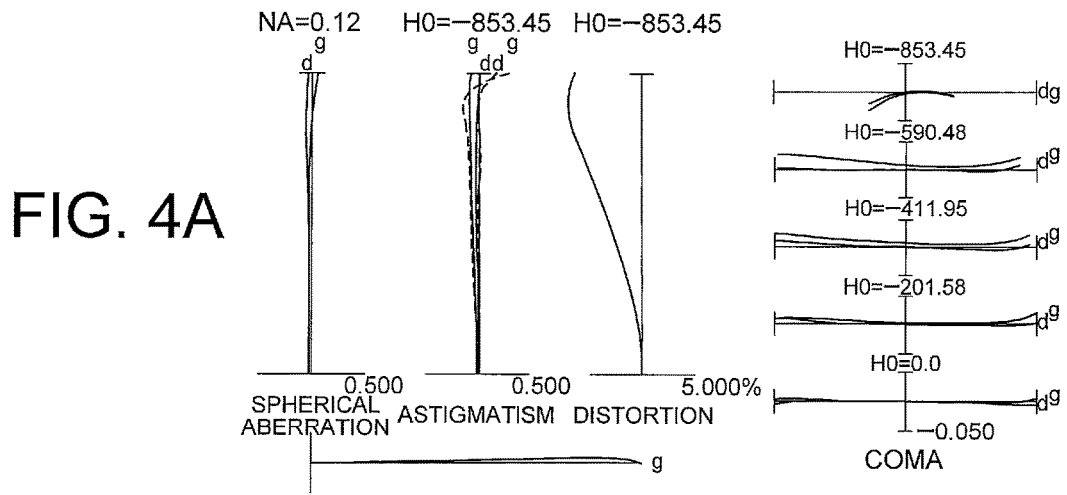
FIGS. 4A, 4B and 4C are graphs showing various aberrations of the variable magnification optical system according to the First Example of the first and second embodiments of the present application upon focusing on a near distance object (shooting magnification-0.0100), in the wide-angle end state, in the first intermediate focal length state, and in the second intermediate focal length state, respectively.
Figure 4B:
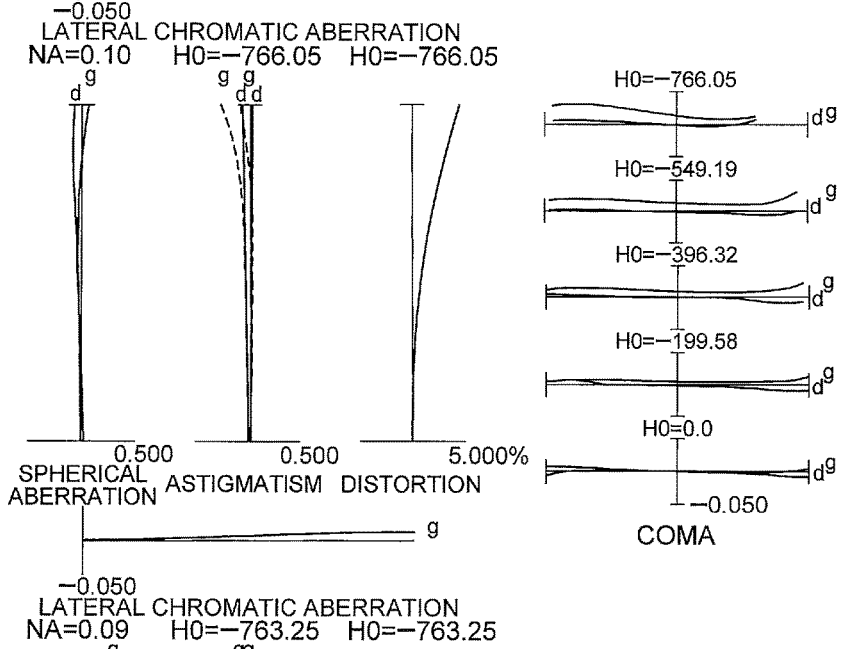
Figure 4C:
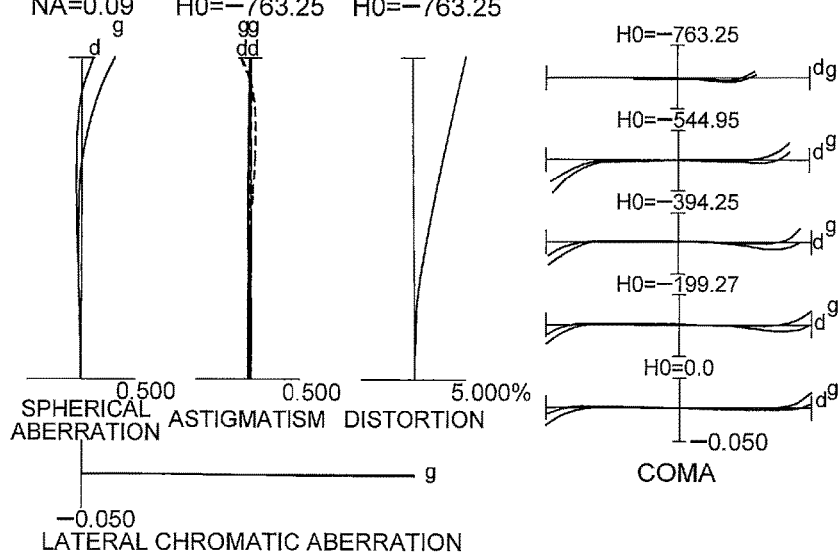

FIGS. 4A, 4B, and 4C are graphs showing various aberrations of the variable magnification optical system according to the First Example of the first and second embodiments of the present application upon focusing on a near distance object (shooting magnification-0.0100) in the wide-angle end state, in the first intermediate focal Length state, and in the second intermediate focal length state, respectively.

Figure 5A:
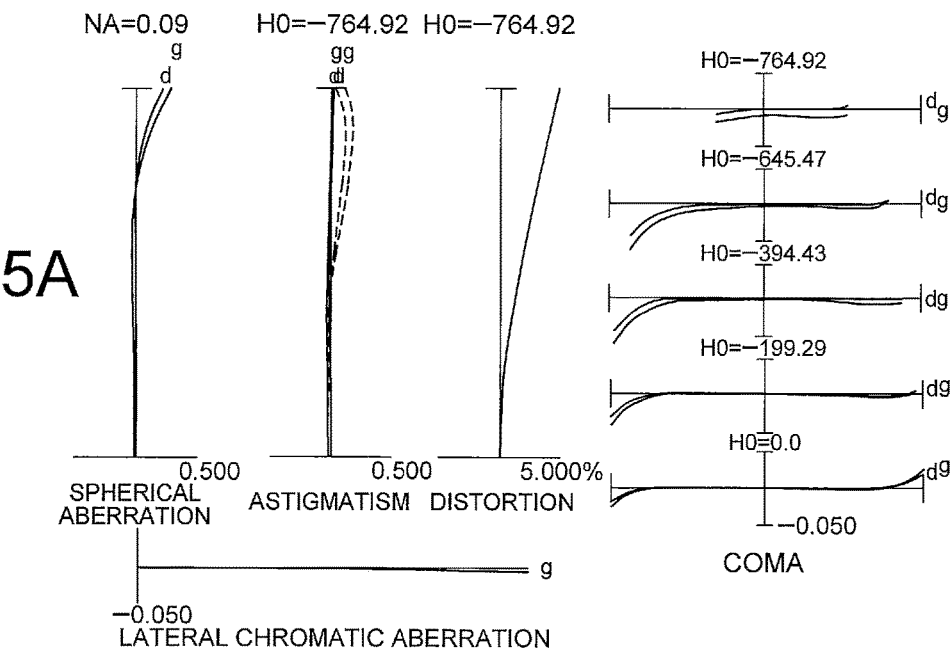
FIGS. 5A and 5B are graphs showing various aberrations of the variable magnification optical system according to the First Example of the first and second embodiments of the present application upon focusing on the near distance object (shooting magnification-0.0100), in the third intermediate focal length state and in the telephoto end state, respectively.
Figure 5B:
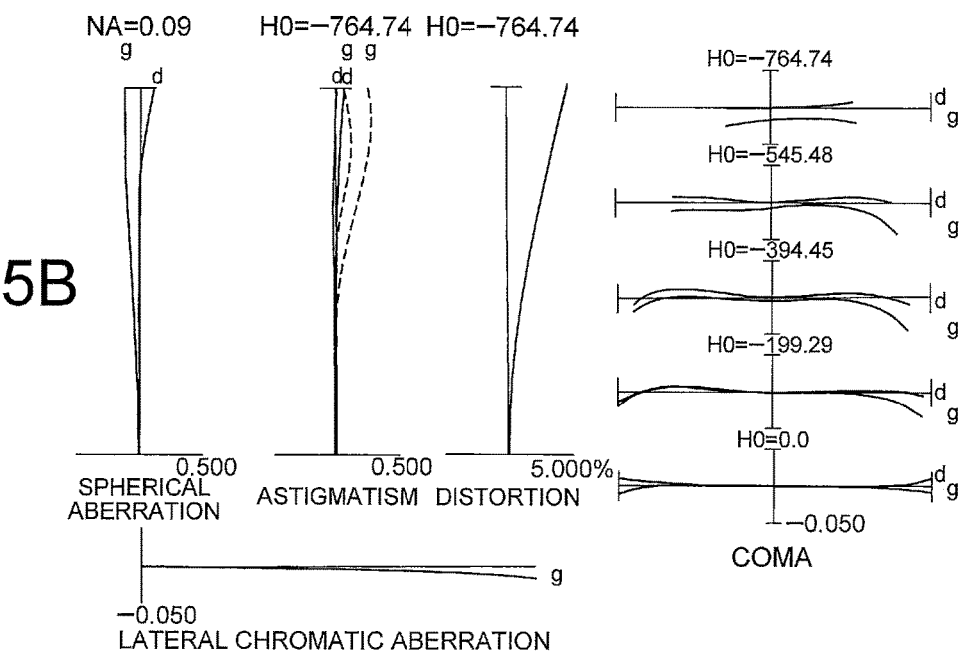
Figure 6A:
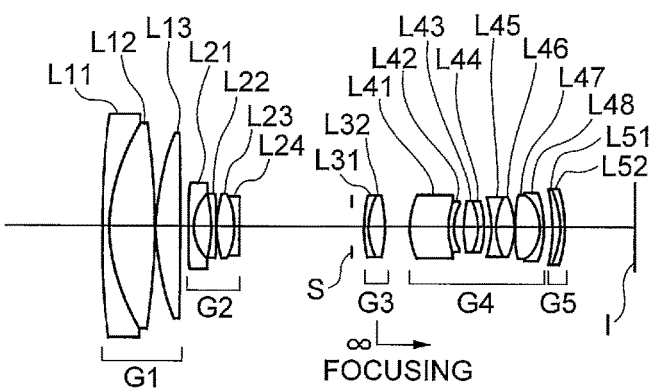
FIGS. 6A, 6B, 6C, 6D and 6E are sectional views showing a variable magnification optical system according to the Second Example of the first and second embodiments of the present application, in a wide-angle end state, in a first intermediate focal length state, in a second intermediate focal length state, in a third intermediate focal length state and in a telephoto end state, respectively.
Figure 6B:
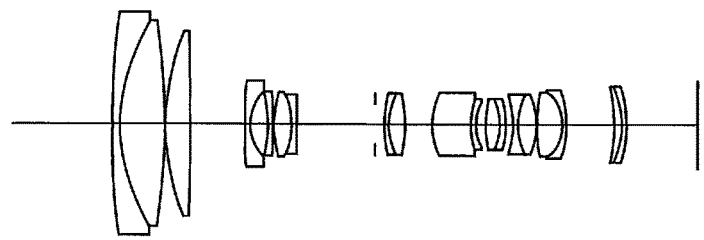
Figure 6C:
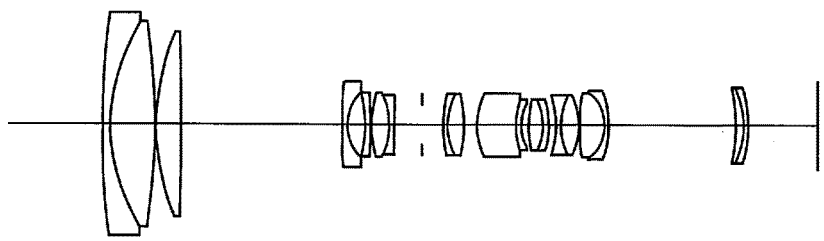
Figure 6D:
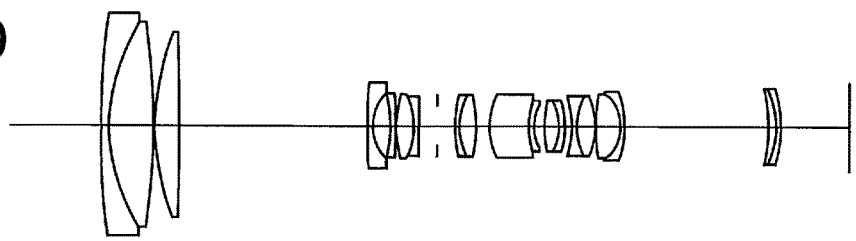
Figure 6E:
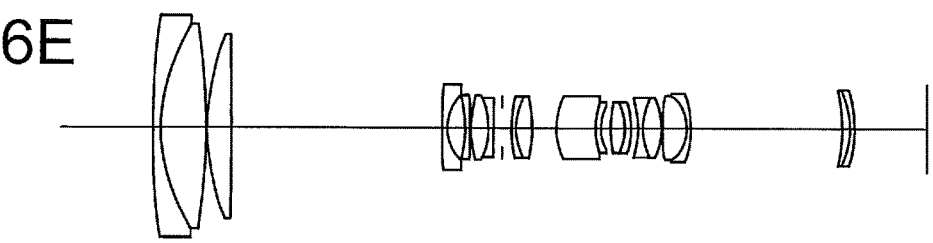

FIGS. 5A and 5B are graphs showing various aberrations of the variable magnification optical system according to the First Example of the first and second embodiments of the present application upon focusing on the near distance object (shooting magnification-0.0100), in the third intermediate focal length state and in the telephoto end state, respectively.

In respective graphs, FNO denotes an F-number, NA denotes a numerical aperture of light rays made incident on the first lens group, A denotes an incident angle of light rays, that is, a half angle of view (unit "−"), and HO denotes an object height (unit "mm"). d denotes an aberration curve at d-line (wavelength λ=587.6 nm), g denotes an aberration curve at g-line (wavelength λ=435.8 nm), and when neither d nor g is mentioned, a curve indicates an aberration at the d-line. In the graph showing astigmatism, a solid line indicates a sagittal image plane, and a broken line indicates a meridional image plane. Incidentally, the above-mentioned symbols in the present Example are also employed in the same manner in the graphs of the after-mentioned Examples.

As is apparent from the respective graphs, the variable magnification optical system according to the present Example shows good corrections to various aberrations from the wide-angle end state through the telephoto end state, and also shows a high optical performance.

Second Example

FIGS. 6A, 6B, 6C, 6D and 6E are sectional views showing a variable magnification optical system according to the Second Example of the first and second embodiments of the present application, in a wide-angle end state, in a first intermediate focal length state, in a second intermediate focal length state, in a third intermediate focal length state and in a telephoto end state, respectively.

The variable magnification optical system according to the present Example is composed of, in order from an sect side: a first lens group G1 having positive refractive power; a second lens group G2 having negative refractive power; a third lens group G3 having positive refractive power; a fourth lens group G4 having positive refractive power as an intermediate lens group, and a fifth lens group G5 having positive refractive power as a fixed lens group.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens cemented with a double concave negative lens L24. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32. Meanwhile, an aperture stop S is disposed on the object side of the third lens group G3.

The fourth lens group G4 consists of, in order from the object side, a cemented lens constructed by a positive meniscus lens L41 having a convex surface facing the object side cemented with a negative meniscus lens L42 having a convex surface facing the object side, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Meanwhile, the negative meniscus lens L48 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens is a class mod type aspherical lens of which a lens surface on the image side is formed into an aspherical shape.

With the above-mentioned configuration, in the variable magnification optical system according to the present Example, upon zooming from the wide-angle end state to the telephoto end state, the first lens group G1 to the fourth lens group G4 are moved along the optical axis such that a distance between the first lens group G1 and the second lens group G2, is distance: between the second lens group G2 and the third lens group G3, a distance between the third lens group G3 and the fourth lens group. G4 and a distance between the fourth lens group G4 and the fifth lens group G5 are varied, respectively.

To be specific, the first lens group G1, the third lens group G3 and the fourth lens group G4 are moved toward the object side upon zooming. The second lens group G2 is moved toward the object side from the wide-angle end state to the third intermediate focal length state and it is moved toward the image side from the third intermediate focal length state to the telephoto end state. The fifth lens group G5 is fixed in a position in the direction of the optical axis upon zooming. Meanwhile, the aperture stop S is moved toward the object side integrally with the fourth lens group G4 upon zooming.

Further, focusing from the infinite distance object to the near distance object is conducted by moving the third lens group G3 toward a side of the image plane I along the optical axis.

Consequently, upon zooming, the distance between the first lens group G1 and the second lens group G2 is increased, the distance between the second lens group G2 and the third lens group G3 is decreased, and the distance between the fourth lens group G4 and the fifth lens group G5 is increased. The distance between the third lens group G3 and the fourth lens group. G4 is increased from the wide-angle end state to the first intermediate focal length state, it is decreased from the first intermediate focal length state to the second intermediate focal length state, and it is increased from the second intermediate focal length state to the telephoto end state. Meanwhile, upon zooming, a distance between the aperture stop S and the third lens group. G3 is decreased from the wide-angle end state to the first intermediate focal length state, it is increased from the first intermediate focal length state to the second intermediate focal length state, and it is decreased from the second intermediate focal length state to the telephoto end state.

Table 2 below shows various values of the variable magnification optical system according to the present. Example.

TABLE 2

| Second Example | | | | |
|---|---|---|---|---|
| [Surface Data] | | | | |
| m | r | d | nd | vd |
| OP | ∞ | | | |
| 1 | 149.1393 | 1.6350 | 1.902650 | 35.73 |
| 2 | 39.3210 | 9.1912 | 1.497820 | 82.57 |
| 3 | −200.0000 | 0.1000 | | |
| 4 | 41.9637 | 5.4484 | 1.729160 | 54.61 |
| 5 | 1039.4250 | d5 | | |
| *6 | 500.0000 | 1.0000 | 1.851350 | 40.10 |
| 7 | 9.7424 | 3.8435 | | |
| 8 | −27.3991 | 1.0000 | 1.883000 | 40.66 |
| 9 | 89.0051 | 0.2895 | | |
| 10 | 21.6984 | 3.7554 | 1.808090 | 22.74 |
| 11 | −15.0205 | 1.0000 | 1.883000 | 40.66 |
| 12 | 103.6128 | d12 | | |
| 13 | ∞ | d13 | | Aperture Stop S |
| 14 | 26.3876 | 1.0000 | 1.883000 | 40.66 |
| 15 | 13.2001 | 3.5030 | 1.593190 | 67.90 |
| 16 | −39.4805 | d16 | | |
| 17 | 12.5000 | 8.2088 | 1.743200 | 49.26 |
| 18 | 25.6321 | 1.0000 | 1.834000 | 37.18 |
| 19 | 9.6066 | 2.0000 | | |
| 20 | 17.4828 | 3.0696 | 1.516800 | 63.88 |
| 21 | −13.7429 | 1.0000 | 1.850260 | 32.35 |
| 22 | −25.6259 | 1.5000 | | |
| 23 | −19.7745 | 1.0000 | 1.850260 | 32.35 |
| 24 | 12.4270 | 3.9453 | 1.620040 | 36.40 |
| 25 | −17.2177 | 0.3559 | | |
| 26 | 44.5160 | 5.3272 | 1.581440 | 40.98 |
| 27 | −8.1562 | 1.0000 | 1.820800 | 42.71 |
| *28 | −28.1926 | d28 | | |
| 29 | −40.0000 | 1.7646 | 1.497820 | 82.57 |
| 30 | −18.8409 | 1.0000 | 1.834410 | 37.28 |
| *31 | −25.0038 | BF | | |
| I | ∞ | | | |

| [Aspherical Data] | | | |
|---|---|---|---|
| m | 6 | 28 | 31 |
| κ | 10.29120 | 1.0000 | 1.00000 |
| A4 | 1.05982E−05 | −7.26393E−05 | 2.68564E−05 |
| A6 | 1.47868E−07 | −3.38257E−07 | 7.91224E−08 |
| A8 | −6.64708E−09 | 1.26743E−09 | −8.06538E−10 |
| A10 | 8.77431E−11 | −2.83030E−11 | 0.00000 |
| A12 | −4.23990E−13 | 0.00000 | 0.00000 |

[Various Data]

zoom ratio 14.13

| | | W | | T |
|---|---|---|---|---|
| | f | 10.30 | ~ | 145.50 |
| | FNO | 4.08 | ~ | 5.71 |
| | ω | 39.62 | ~ | 3.01° |
| | Y | 8.00 | ~ | 8.00 |
| | TL | 112.60 | ~ | 162.60 |

| | W | M1 | M2 | M3 | T |
|---|---|---|---|---|---|
| f | 10.30001 | 18.00395 | 60.55030 | 89.50052 | 145.50102 |
| ω | 39.61866 | 23.08393 | 7.20247 | 4.88583 | 3.00545 |
| FNO | 4.08 | 4.79 | 5.49 | 5.75 | 5.72 |
| φ | 9.01 | 9.02 | 9.02 | 9.26 | 10.08 |
| d5 | 2.10000 | 11.86757 | 33.84673 | 38.94667 | 43.98780 |
| d12 | 24.38938 | 17.21960 | 5.86923 | 4.42463 | 2.20000 |
| d13 | 2.46923 | 1.80000 | 4.59702 | 3.69702 | 1.80000 |
| d16 | 5.02779 | 5.69702 | 2.90000 | 3.80000 | 5.69702 |
| d28 | 1.62642 | 10.35671 | 26.30176 | 30.05048 | 31.92800 |
| BF | 14.04946 | 14.04953 | 14.04979 | 14.04990 | 14.05006 |

TABLE 2-continued

Second Example

[Focusing Group Movement Amount Upon Focusing]

|  | W | M1 | M2 | M3 | T |
|---|---|---|---|---|---|
| shooting magnification | −0.0100 | −0.0100 | −0.0100 | −0.0100 | −0.0100 |
| shooting distance | 1002.7184 | 1753.8805 | 5887.3315 | 8709.3640 | 14147.3818 |
| movement amount | 0.1340 | 0.1142 | 0.1657 | 0.2131 | 0.3302 |

[Lens Group Data]

|  | ST | f |
|---|---|---|
| G1 | 1 | 64.91265 |
| G2 | 6 | −9.00339 |
| G3 | 14 | 38.07719 |
| G4 | 17 | 46.69911 |
| G5 | 29 | 260.10501 |

[Values for Conditional Expressions]

| (1-1) | f3/ft = 0.262 |
| (1-2) | (d3t − d3w)/ft = 0.005 |
| (1-3) | f3/fim = 0.815 (fim = f4) |
| (2-1) | f3/ft = 0.262 |
| (2-2) | (d3t − d3w)/ft = 0.005 |
| (2-3) | f2/fw = −0.874 |
| (2-4) | f3/f4 = 0.815 |

Figure 7A:
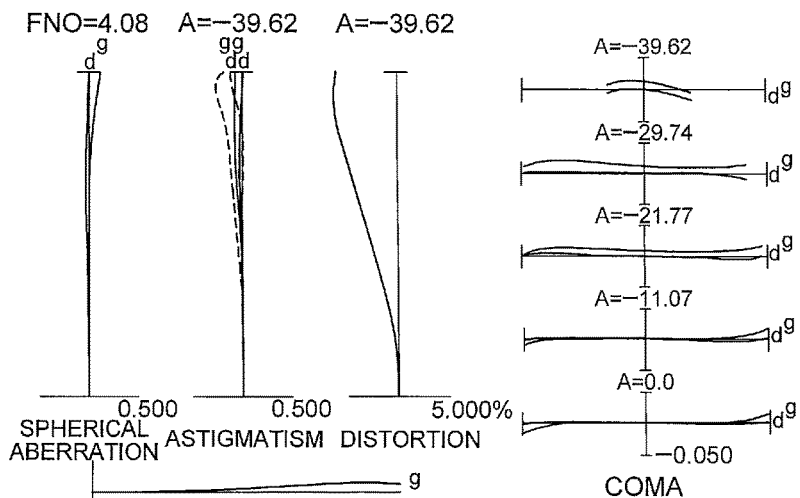
FIGS. 7A, 7B, and 7C are graphs showing various aberrations of the variable magnification optical system according to the Second Example of the first and second embodiments of the present application upon focusing on an infinite distance object, in the wide-angle end state, in the first intermediate focal length state, and in the second intermediate focal length state, respectively.
Figure 7B:
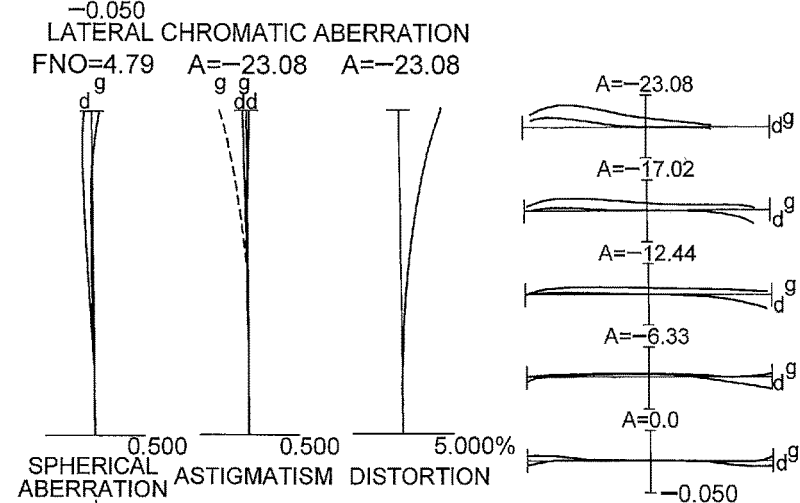
Figure 7C:
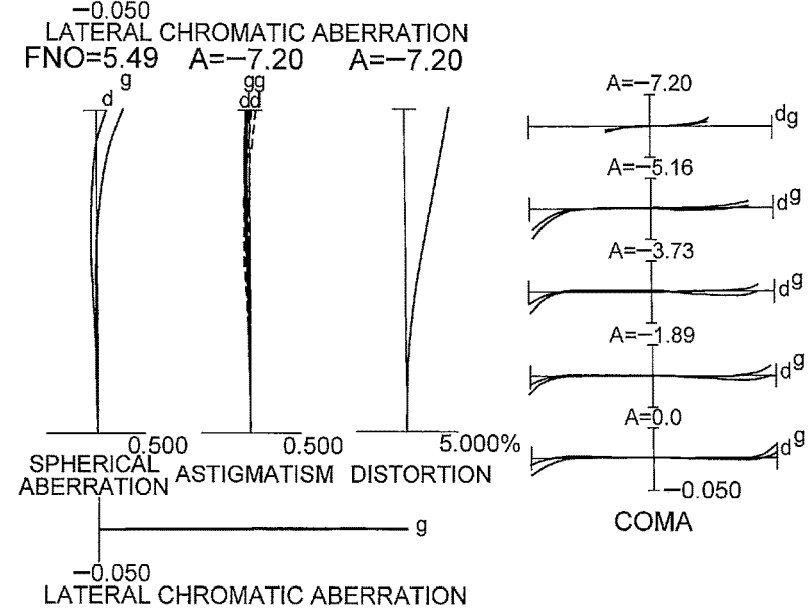

FIGS. 7A, 7B and 7C are graphs showing various aberrations of the variable magnification optical system according to the Second Example of the first and second embodiments of the present application upon focusing on an infinite distance object, in the wide-angle end state, in the first intermediate focal length state, and in the second intermediate focal length state, respectively.

Figure 8A:
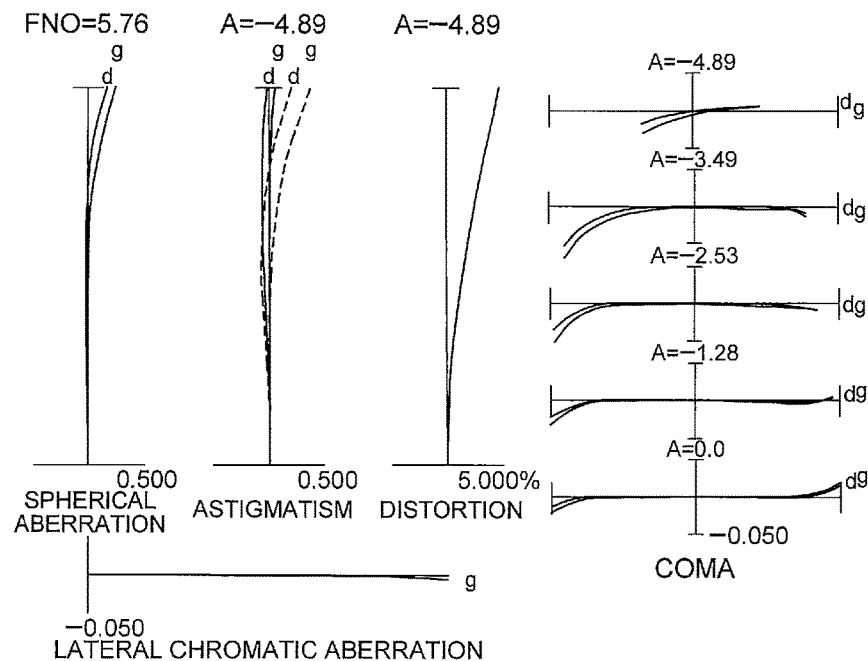
FIGS. 8A and 8B are graphs showing various aberrations of the variable magnification optical system according to the Second Example of the first and second embodiments of the present application upon focusing on the infinite distance object, in the third intermediate focal length state and in the telephoto end state, respectively.
Figure 8B:
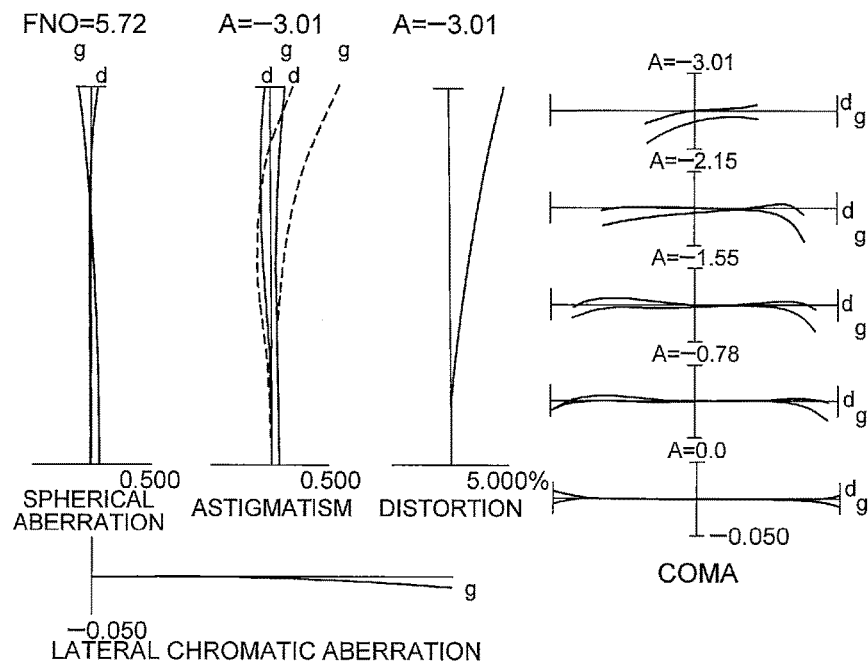

FIGS. 8A and 8B are graphs showing various aberrations of the variable magnification optical system according to the Second Example of the first and second embodiments of the present application upon focusing on the infinite distance object, in the third intermediate focal length state and in the telephoto end state, respectively.

Figure 9A:
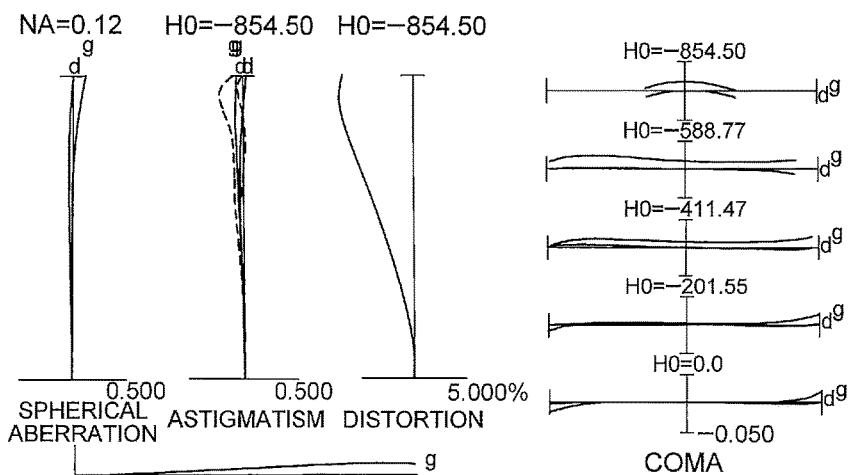
FIGS. 9A, 9B and 9C are graphs showing various aberrations of the variable magnification optical system according to the Second Example of the first and second embodiments of the present application upon focusing on a near distance object (shooting magnification-0.0100), in the wide-angle end state, in the first intermediate focal length state, and in the second intermediate focal length state, respectively.
Figure 9B:
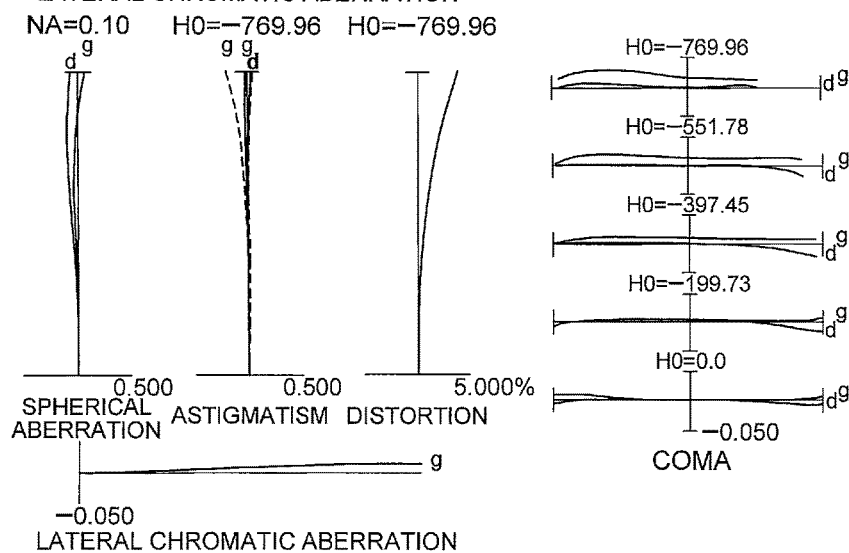
Figure 9C:
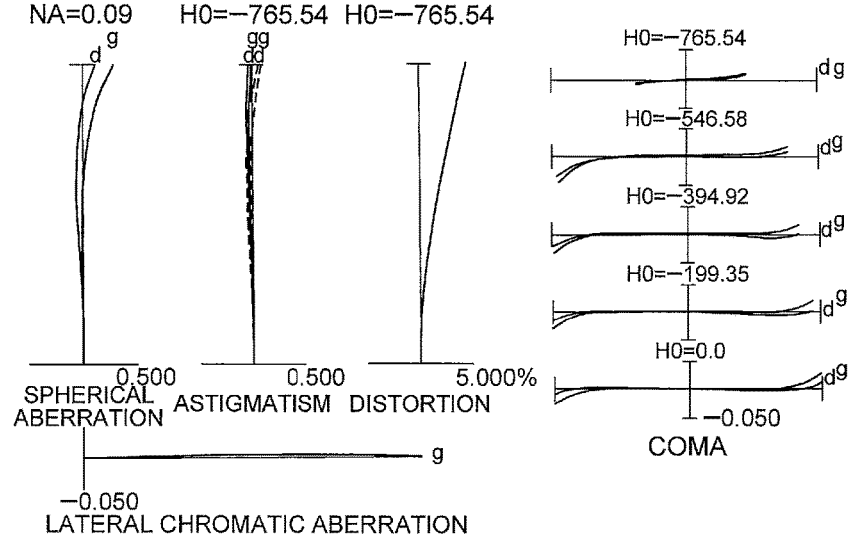

FIGS. 9A, 9B and 9C are graphs showing various aberrations of the variable magnification optical system according to the Second Example of the first and second embodiments of the present application upon focusing on a near distance object (shooting magnification-0.0100), in the wide-angle end state, in the first intermediate focal length state, and in the second intermediate focal length state, respectively.

Figure 10A:
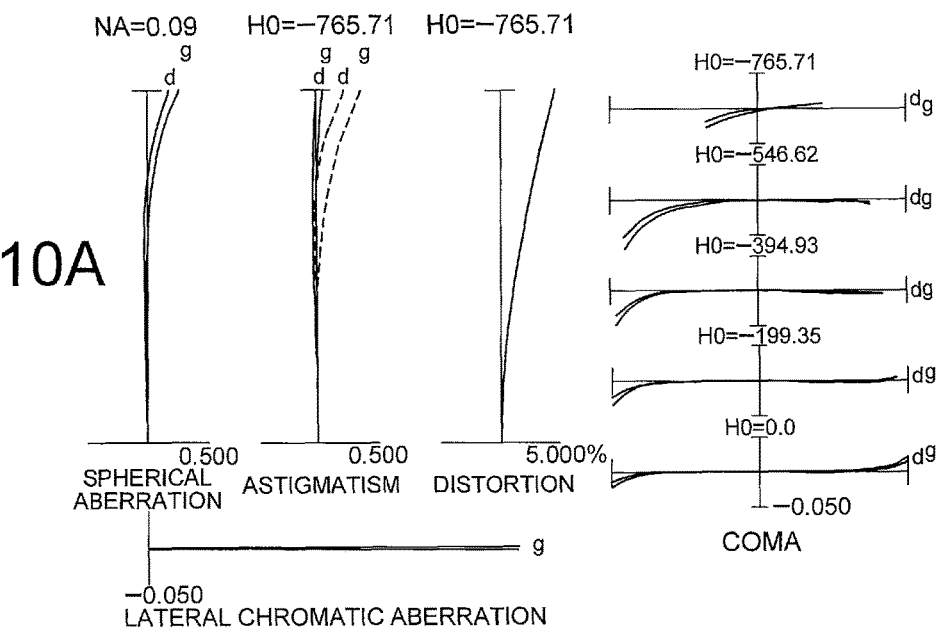
FIGS. 10A and 10B are graphs showing various aberrations of the variable magnification optical system according to the Second Example of the first and second embodiments of the present application upon focusing on the near distance object (shooting magnification-0.0100), in the third intermediate focal length state and in the telephoto end state, respectively.
Figure 10B:
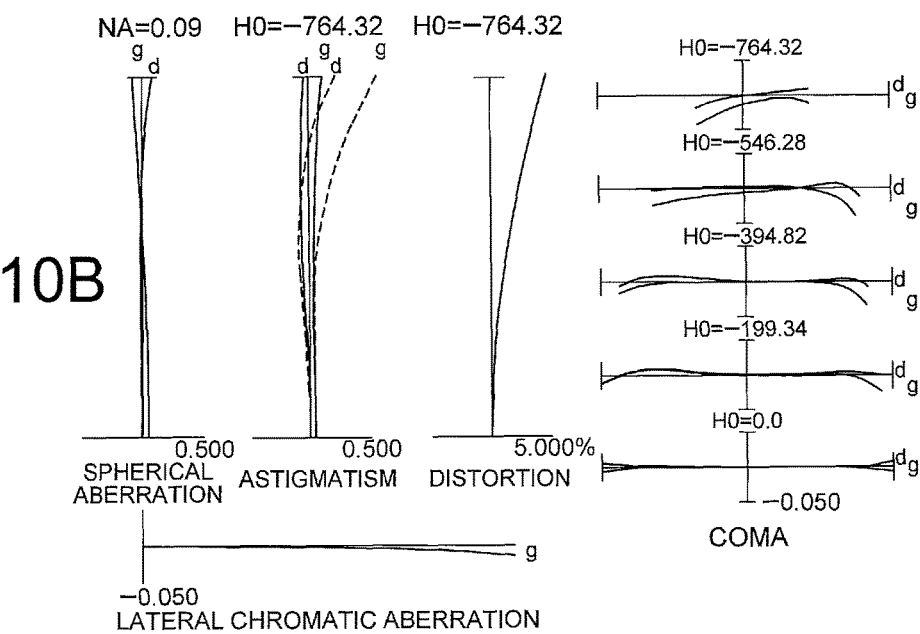
Figure 11A:
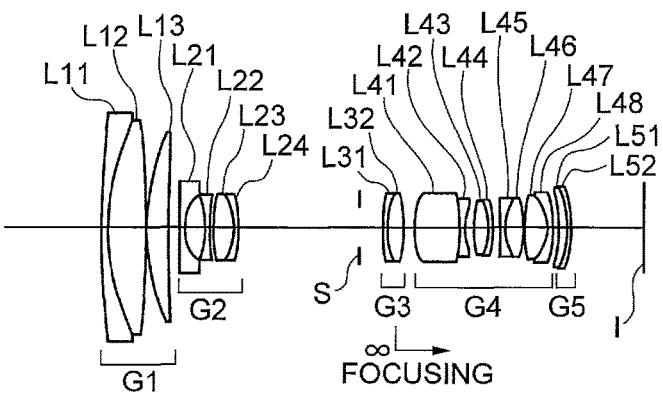
FIGS. 11A, 11B, 11C, 11D and 11E are sectional views showing a variable magnification optical system according to the Third Example of the first and second embodiments of the present application, in a wide-angle end state, in a first intermediate focal length state, in a second intermediate focal length state, in a third intermediate fecal length state and in a telephoto end state, respectively.
Figure 11B:
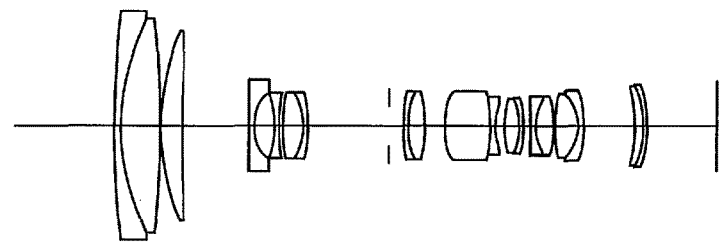
Figure 11C:
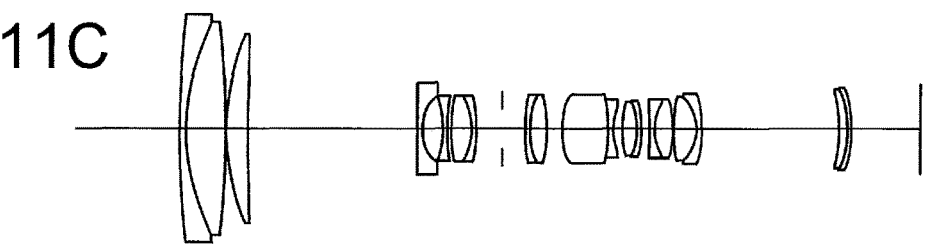
Figure 11D:
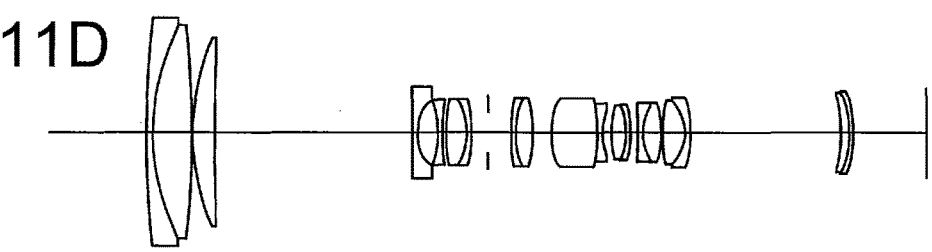
Figure 11E:
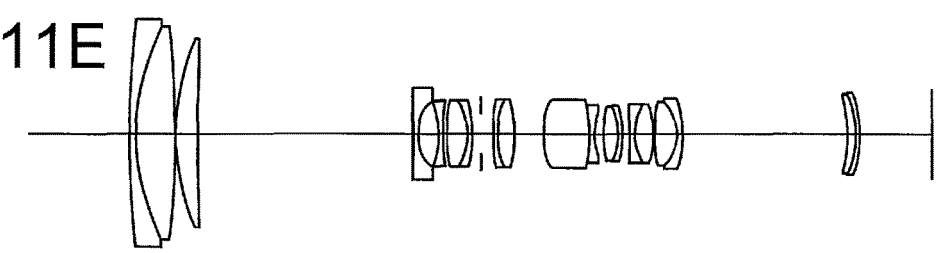

FIGS. 10A and 10B are graphs showing various aberrations of the variable magnification optical system according to the Second Example of the first and second embodiments of the present application upon focusing on the near distance object (shooting magnification-0.0100), in the third intermediate focal length state and in the telephoto end state, respectively.

As is apparent from the respective graphs, the variable magnification optical system according to the present Example shows good corrections to various aberrations from the wide-angle end state through the telephoto end state, and also shows a high optical performance.

Third Example

FIGS. 11A, 11B, 11C, 11D and 11E are sectional views showing a variable magnification optical system according to the Third Example of the first and second embodiments of the present application, in a wide-angle end state, in a first intermediate focal length state, in a second intermediate focal length state, in a third intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power as an intermediate lens group, and a fifth lens group having positive refractive power as a fixed lens group.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a negative meniscus lens L24 having a concave surface facing the object side. Meanwhile, the negative meniscus lens L21 is a glass mold type aspherical lens of which a lens surface on the object side is formed into an aspherical shame.

The third lens group G3 consists of, in order from the object side, a cemented lens constructed by a negative meniscus lens L31 having a convex surface facing the object side cemented with a double convex positive lens L32. Meanwhile, an aperture stop S is disposed on the object side of the third lens group G3.

The fourth lens group G4 consists of, in order from the obi act side, a cemented lens constructed by a double convex positive lens L41 cemented with a double concave negative lens L42, a cemented lens constructed by a double convex positive lens L43 cemented with a negative meniscus lens L44 having a concave surface facing the object side, a cemented lens constructed by a double concave negative lens L42 cemented with a double convex positive lens L46, and a cemented lens constructed by a double convex positive lens L47 cemented with a negative meniscus lens L48 having a concave surface facing the object side. Meanwhile, the negative meniscus lens L48 is a glass mold type aspherical lens of which a lens surface on the image side is formed into an aspherical shape.

The fifth lens group G5 consists of, in order from the object side, a cemented lens constructed by a objective meniscus lens L51 having a concave surface facing the object side cemented with a negative meniscus lens L52 having a concave surface facing the object side. Meanwhile, the negative meniscus lens L52 is a glass mod type aspherical lens of which a lens surface on the image side is formed into an aspherical shape.

With the above-mentioned configuration, in the variable magnification optical system according to the present Example, upon zooming from the wide-angle end state to the telephoto end state, the first lens group G1 to the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G2 are varied, respectively. The fifth lens group G5 is fixed in a position in the direction of the optical axis noon zooming. Meanwhile, the aperture stop S is moved toward the object side integrally with the fourth lens group G4 upon zooming.

Further, focusing from the infinite distance object to the near distance object is conducted by moving the third lens group G3 toward a side of the image plane I along the optical axis.

To be specific, upon zooming, the distance between the first lens group G1 and the second lens group G2 is increased, the distance between the second lens group G2 and the third lens group G3 is decreased, and the distance between the fourth lens group G4 and the fifth lens group G5 is increased. The distance between the third lens group G3 and the fourth lens group G4 is increased from the wide-angle end state to the first intermediate focal length state, it is decreased from the first intermediate focal length state to the second intermediate focal length state, and it is increased from the second intermediate focal length state to the telephoto and state. Meanwhile, upon zooming, a distance between the aperture stop S and the third lens group G3 is decreased from the wide-angle end state to the first intermediate focal length state, it is increased from the first intermediate focal length state to the second intermediate focal length state, and it is decreased from the second intermediate focal length state to the telephoto end state.

Table 3 below shows various values of the variable magnification optical system according to the present Example.

TABLE 3

Third Example

[Surface Data]

| m | r | d | nd | vd |
|---|---|---|---|---|
| OP | ∞ | | | |
| 1 | 142.4935 | 1.6350 | 1.950000 | 29.37 |
| 2 | 42.2502 | 8.5971 | 1.497820 | 82.57 |
| 3 | −244.5599 | 0.1000 | | |
| 4 | 43.5280 | 4.7901 | 1.834810 | 42.73 |
| 5 | 290.5464 | d5 | | |
| *6 | 500.0000 | 1.0000 | 1.851350 | 40.10 |
| 7 | 9.0471 | 4.3168 | | |
| 8 | −20.3544 | 1.0000 | 1.903660 | 31.27 |
| 9 | 42.4575 | 0.7313 | | |
| 10 | 28.0881 | 4.0634 | 1.808090 | 22.74 |
| 11 | −12.5975 | 1.0000 | 1.883000 | 40.66 |
| 12 | −38.6924 | d12 | | |
| 13 | ∞ | d13 | Aperture Stop S | |
| 14 | 31.6163 | 1.0000 | 1.883000 | 40.66 |
| 15 | 15.7262 | 3.3464 | 1.593190 | 67.90 |
| 16 | −39.3012 | d16 | | |
| 17 | 13.5000 | 9.6782 | 1.717000 | 47.98 |
| 18 | −38.7323 | 1.0000 | 1.883000 | 40.66 |
| 19 | 11.8099 | 2.0000 | | |
| 20 | 19.9976 | 3.2554 | 1.516800 | 63.88 |
| 21 | −12.0110 | 1.0000 | 1.850260 | 32.35 |
| 22 | −20.9691 | 1.5000 | | |
| 23 | −39.8308 | 1.0000 | 1.950000 | 29.37 |
| 24 | 10.4776 | 3.5701 | 1.672700 | 32.19 |
| 25 | −30.1182 | 0.5349 | | |
| 26 | 36.6513 | 5.1773 | 1.581440 | 40.98 |
| 27 | −8.5118 | 1.0000 | 1.820800 | 42.71 |
| *28 | −28.2741 | d28 | | |
| 29 | −40.0000 | 1.9141 | 1.497820 | 82.57 |
| 30 | −18.1052 | 1.0000 | 1.834410 | 37.28 |
| *31 | −22.6207 | BF | | |
| I | ∞ | | | |

TABLE 3-continued

Third Example

[Aspherical Data]

| m | 6 | 28 | 31 |
|---|---|---|---|
| κ | -3.81950 | 1.0000 | 1.00000 |
| A4 | 4.21558E-05 | -6.70317E-05 | 2.67692E-05 |
| A6 | -2.17082E-07 | -2.82990E-07 | 2.52197E-08 |
| A8 | -2.45102E-09 | 5.39592E-10 | -6.04092E-10 |
| A10 | 5.51411E-11 | -1.47007E-11 | 0.00000 |
| A12 | -2.85950E-13 | 0.00000 | 0.00000 |

[Various Data]

zoom ratio 14.13

| | W | T |
|---|---|---|
| f | 9.27 ~ | 130.95 |
| FNO | 4.11 ~ | 5.71 |
| ω | 42.66 ~ | 3.37° |
| Y | 8.00 ~ | 8.00 |
| TL | 113.35 ~ | 167.85 |

| | W | M1 | M2 | M3 | T |
|---|---|---|---|---|---|
| f | 9.27001 | 17.98649 | 60.50024 | 89.50040 | 130.95047 |
| ω | 42.66459 | 22.98882 | 7.25983 | 4.93130 | 3.37079 |
| FNO | 4.11 | 5.12 | 5.73 | 5.75 | 5.71 |
| φ | 8.59 | 8.59 | 9.57 | 10.18 | 11.03 |
| d5 | 2.10000 | 14.22823 | 35.96983 | 41.57489 | 45.70436 |
| d12 | 24.57776 | 16.27840 | 5.38702 | 3.71762 | 2.20000 |
| d13 | 5.01075 | 3.17327 | 4.36075 | 3.46075 | 1.80000 |
| d16 | 2.25000 | 4.08748 | 2.90000 | 3.80000 | 5.46075 |
| d28 | 1.15583 | 11.01481 | 29.01229 | 32.10086 | 34.42483 |
| BF | 14.04945 | 14.04946 | 14.04979 | 14.04987 | 14.04999 |

[Focusing Group Movement Amount Upon Focusing]

| | W | M1 | M2 | M3 | T |
|---|---|---|---|---|---|
| shooting magnification | -0.0100 | -0.0100 | -0.0100 | -0.0100 | -0.0100 |
| shooting distance | 901.3901 | 1749.0924 | 5884.2963 | 8698.3557 | 12722.0798 |
| movement amount | 0.1657 | 0.1331 | 0.1783 | 0.2359 | 0.3221 |

[Lens Group Data]

| | ST | f |
|---|---|---|
| G1 | 1 | 67.49208 |
| G2 | 6 | -9.52181 |
| G3 | 14 | 41.09622 |
| G4 | 17 | 53.39457 |
| G5 | 29 | 147.67270 |

[Values for Conditional Expressions]

| (1-1) | f3/ft = 0.314 |
| (1-2) | (d3t - d3w)/ft = 0.025 |
| (1-3) | f3/fim = 0.770 (fim = f4) |
| (2-1) | f3/ft = 0.314 |
| (2-2) | (d3t - d3w)/ft = 0.025 |
| (2-3) | f2/fw = -1.027 |
| (2-4) | f3/f4 = 0.770 |

Figure 12A:
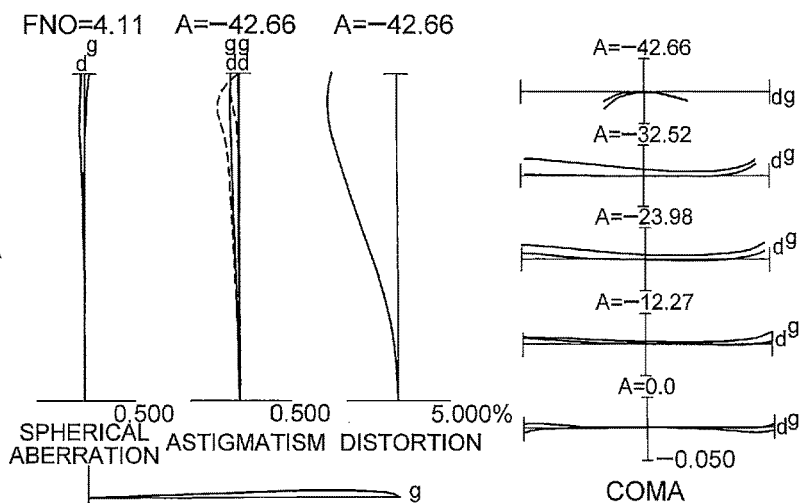
FIGS. 12A, 12B and 12C are graphs showing various aberrations of the variable magnification optical system according to the Third. Example of the first and second embodiments of the present application upon focusing on an infinite distance object, in the wide-angle end state, in the first intermediate focal length state, and in the second intermediate focal length state, respectively.
Figure 12B:
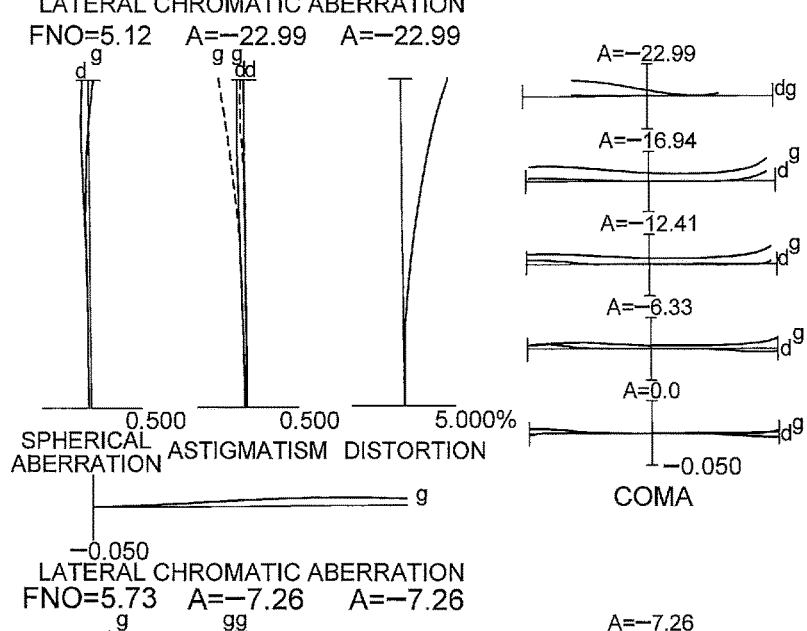
Figure 12C:
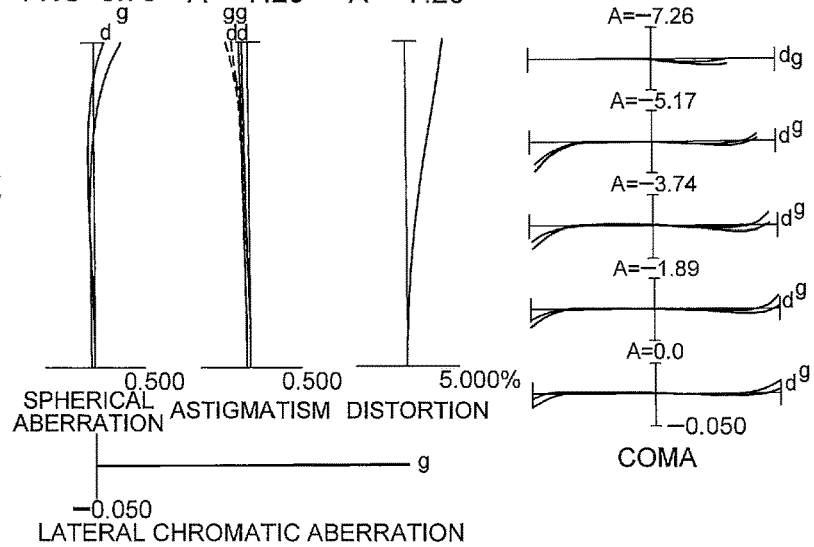

FIGS. 12A, 12B and 12C are graphs showing various aberrations of the variable magnification optical system according to the Third Example of the first and second embodiments of the present application upon focusing on an infinite distance object, in the wide-mangle end state, in the first intermediate focal length state, and in the second intermediate focal length state, respectively.

Figure 13A:
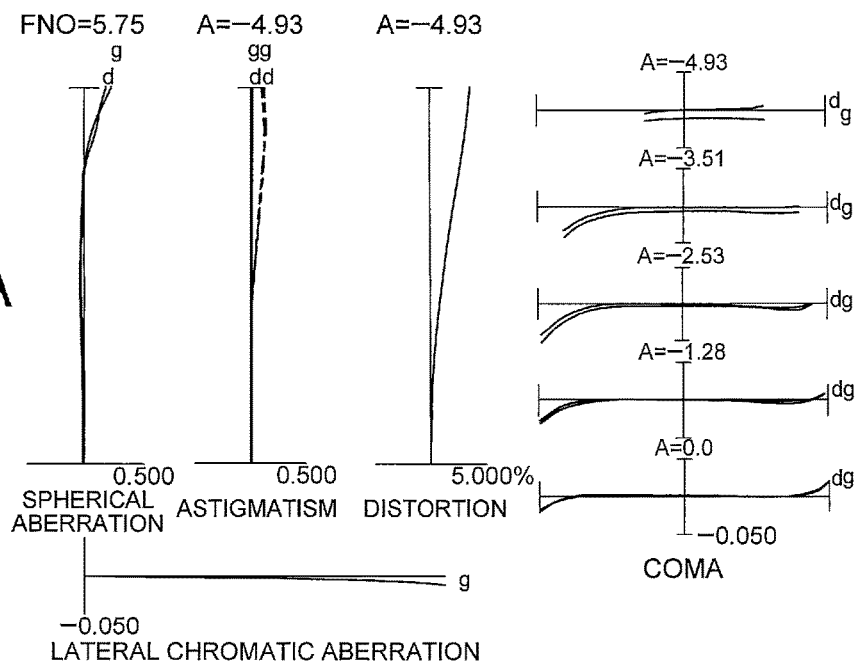
FIGS. 13A and 13B are graphs showing various aberrations of the variable magnification optical system according to the Third Example of the first and second embodiments of the present application upon focusing on the infinite distance object, in the third intermediate focal length state and in the telephoto and state, respectively.
Figure 13B:
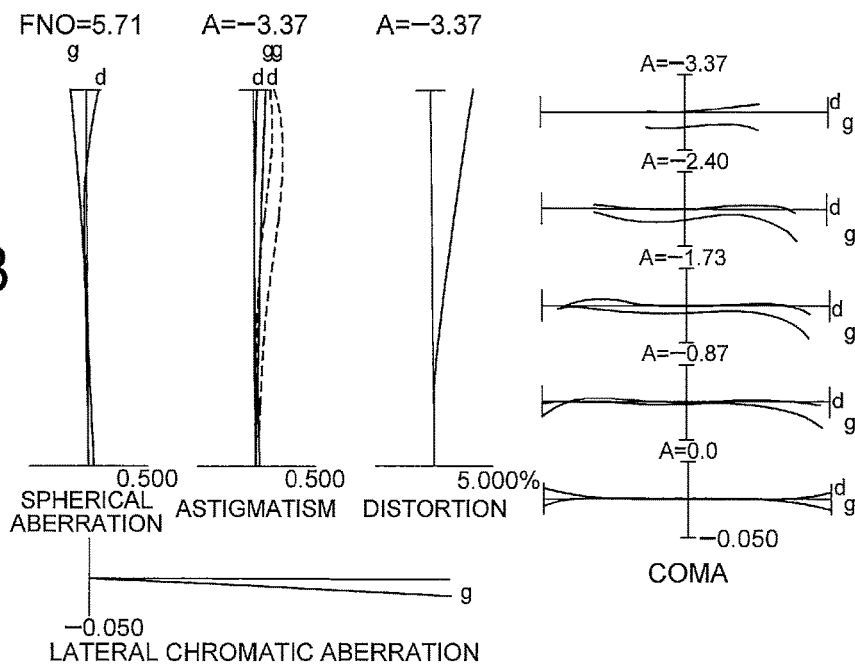

FIGS. 13A and 13B, are graphs showing various aberrations of the variable magnification optical system according to the Third Example of the first and second embodiments of the present application upon focusing on the infinite distance object, in the third intermediate focal length state and in the telephoto end state, respectively.

Figure 14A:
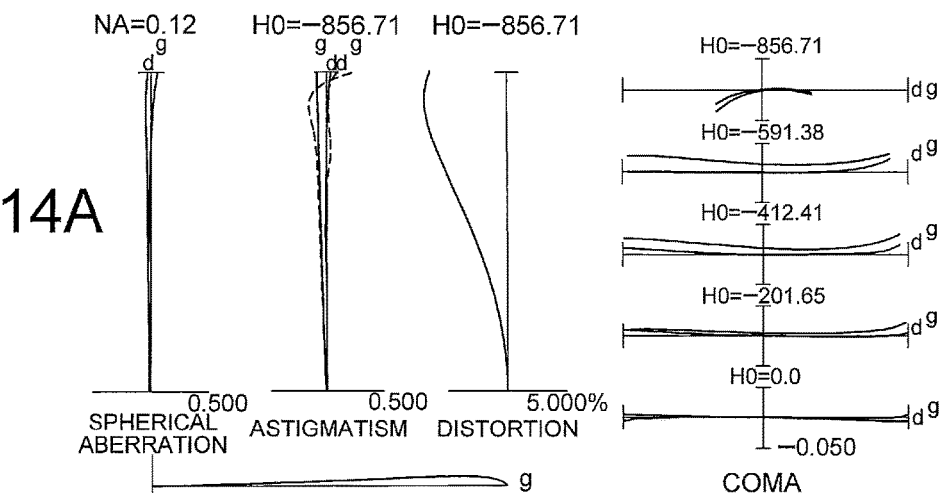
FIGS. 14A, 14B, and 14C are graphs showing various aberrations of the variable magnification optical system according to the Third Example of the first and second embodiments of the present application upon focusing on a near distance object (shooting magnification-0.0100), in the wide-angle end state, in the first intermediate focal length state, and in the second intermediate focal length state, respectively.
Figure 14B:
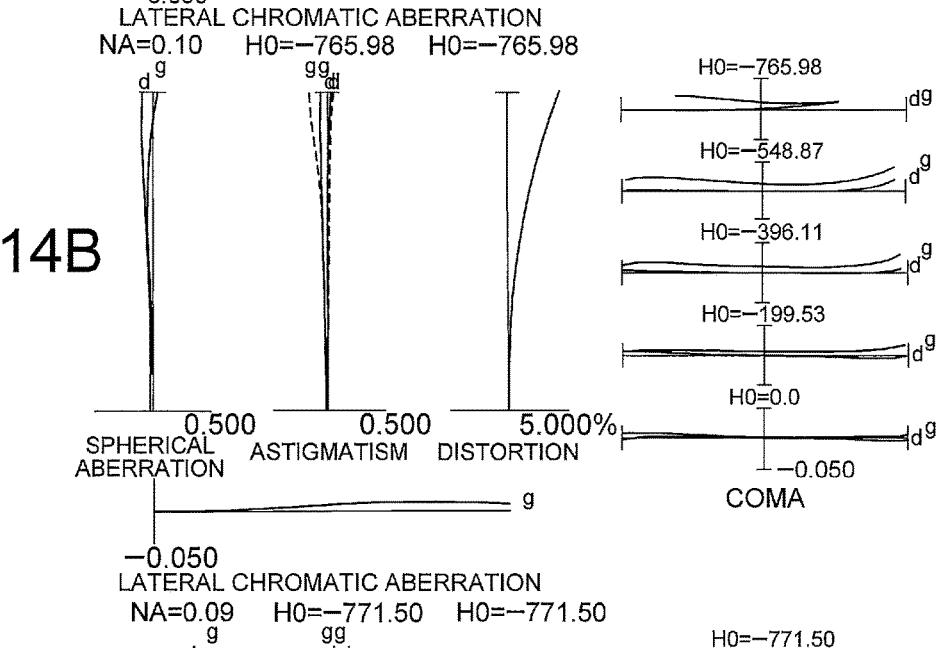
Figure 14C:
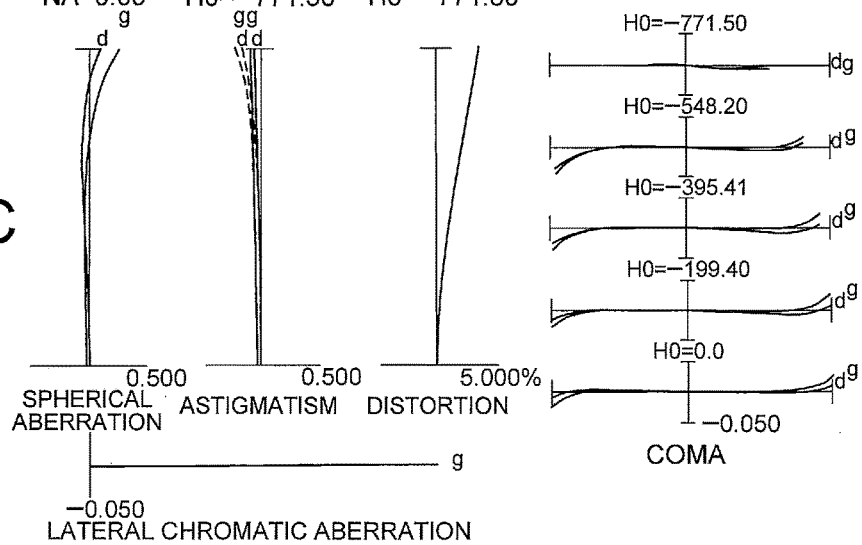

FIGS. 14A, 14B and 14C are graphs showing various aberrations of the variable magnification optical system according to the Third Example of the first, and second embodiments of the present application upon focusing on a near distance object (shooting magnification-0.0100), in the wide-angle and state, in the first intermediate focal length state, and in the second intermediate focal length state, respectively.

Figure 15A:
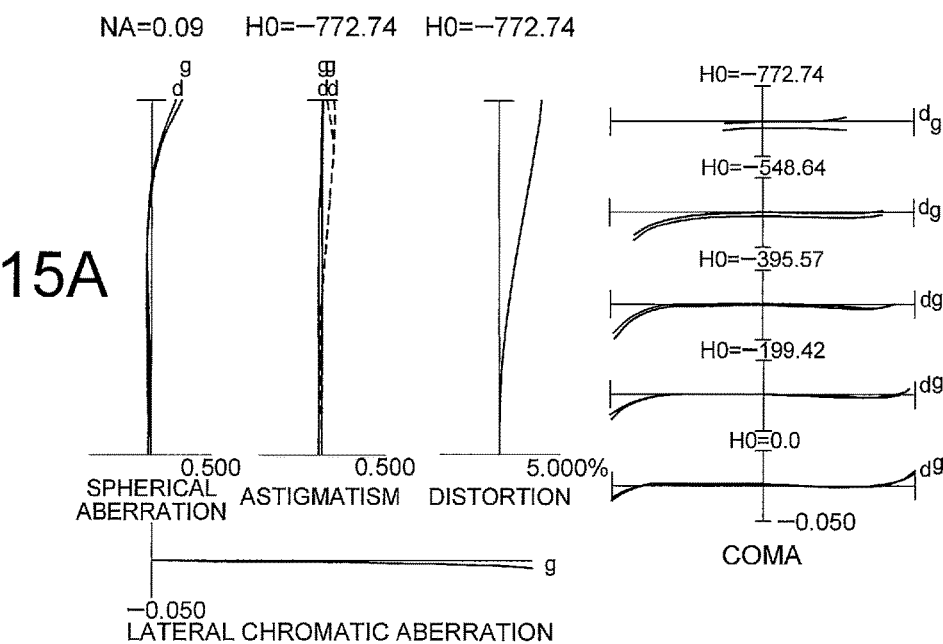
FIGS. 15A and 15B are graphs showing various aberrations of the variable magnification optical system according to the Third Example of the first and second embodiments of the present application upon focusing on the near distance object. (shooting magnification-0.0100), in the third intermediate focal length state and in the telephoto end state, respectively.
Figure 15B:
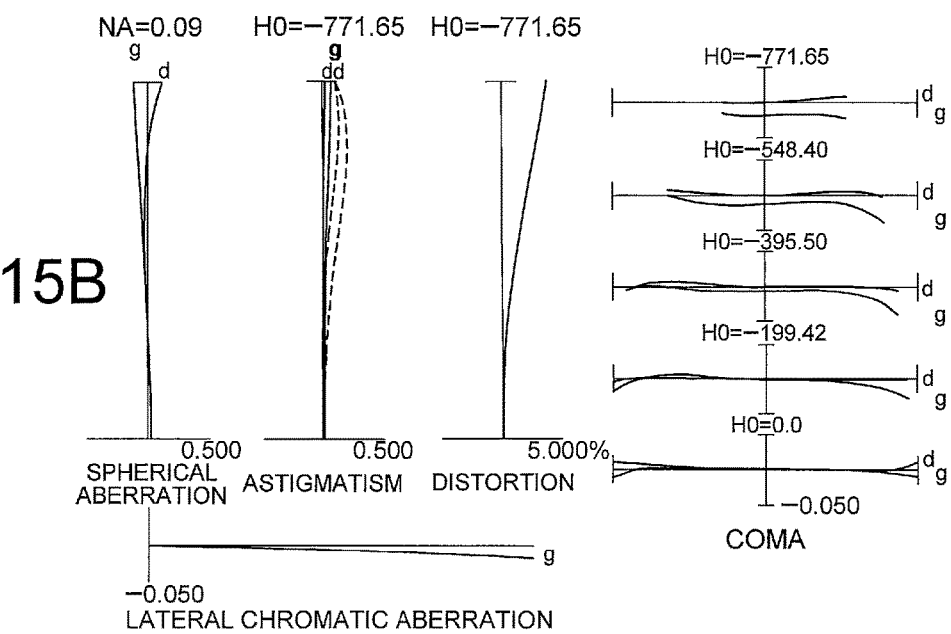
Figure 16A:
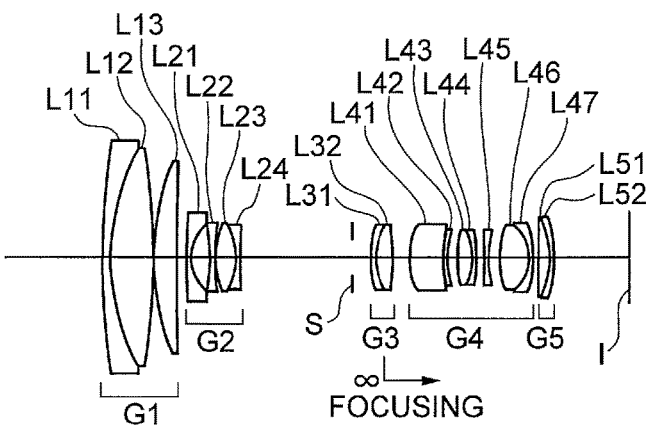
FIGS. 16A, 16B, 16C, 16D and 16E are sectional views showing a variable magnification optical system according to the Fourth Example of the first and second embodiments of the present application, in a wide-angle end state, in a first intermediate focal length state, in a second intermediate focal length state, in a third intermediate focal length state and in a telephoto end state, respectively.
Figure 16B:
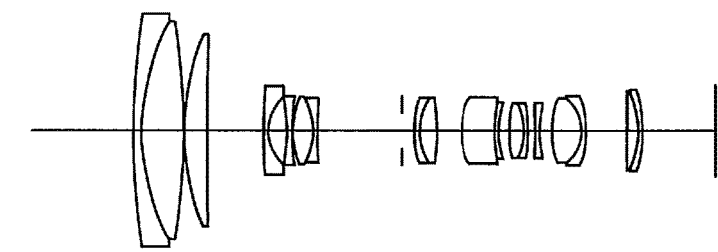
Figure 16C:
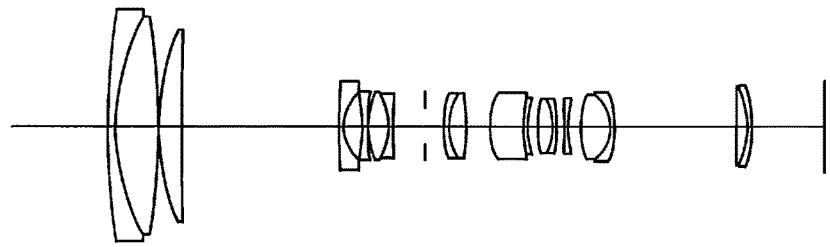
Figure 16D:
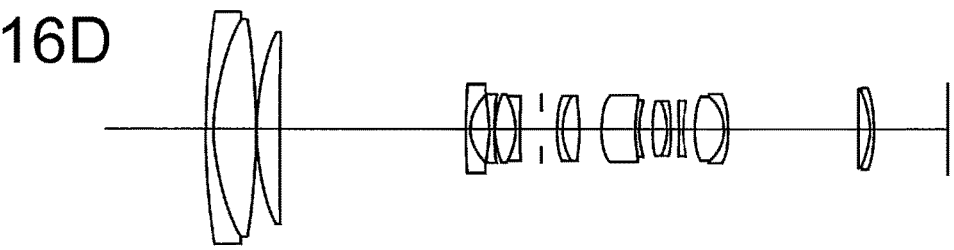
Figure 16E:
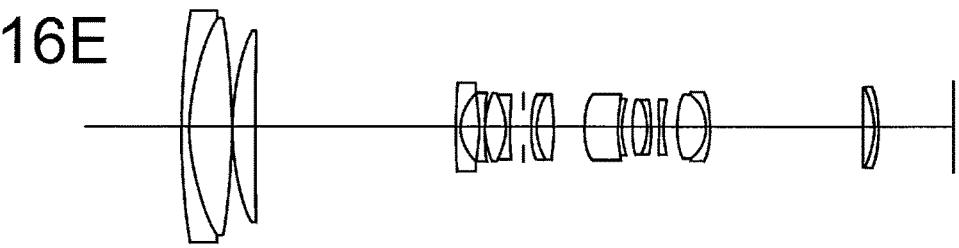

FIGS. 15A and 15B are graphs showing various aberrations of the variable magnification optical system according to the Third Example of the first and second embodiments of the present application upon focusing on the near distance object (shooting magnification-0.0100), in the third intermediate focal length state and in the telephoto end state, respectively.

As is apparent from the respective graphs, the variable magnification optical system according to the present Example shows good corrections to various aberrations from the wide-angle end state through the telephoto end state, and also shows a high optical performance.

Fourth Example

FIGS. 16D, 16B, 16C, 16D and 16E are sectional views showing a variable magnification optical system according to the Fourth Example of the first and second embodiments of the present application, in a wide-angle end state, in a first intermediate focal length state, in a second intermediate focal length state, in a third intermediate focal length state and in a telephoto end state, respectively.

The variable magnification optical system according to the present Example is composed of, in order from an object aide: a first lens (group G1 having positive refractive power; a second lens group G2 having negative refractive power; a third lens group G3 having positive refractive power; a fourth lens group G4 having positive refractive power as an intermediate lens group, and a fifth lens group G5 having positive refractive power an a fixed lens group.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a double concave negative lens L24. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32. Meanwhile, an aperture stop S is disposed on the object side of the third lens group G3.

The fourth lens group G4 consists of, in order from the object side, a cemented lens constructed by a positive meniscus lens L41 having a convex surface facing the object side cemented with a negative meniscus lens L42 having a convex surface facing the object side, a cemented lens constructed by a double convex positive lens L43 cemented with a negative meniscus lens L44 having a concave surface facing the object side, a double concave negative lens L45, and a cemented lens constructed by a double convex positive lens L46 cemented with a negative meniscus lens L47 having a concave surface facing the object side. Meanwhile, the negative lens L45 is a glass mold type aspherical lens of which a lens surface on the object side is formed into an aspherical shape, and the negative meniscus lens L47 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon zooming from the wide-angle end state to the telephoto end state, the first lens group G1 to the fourth lens group G4 are moved along the optical axis such that a distance between the first lens group G1 and the second lens croup G2, a distance between the second lens group G2 and the third lens group G3, a distance between the third lens group G3 and the fourth lens group G4 and a distance between the fourth lens group G4 and the fifth lens group G5 are varied, respectively.

To be specific, the first lens group G1, the third lens group G3 and the fourth lens group G4 are moved toward the object side upon zooming. The second lens group G2 is moved toward the object side from the wide-angle end state to the second intermediate focal length state, it is moved toward the image side from the second intermediate focal length state to the third intermediate focal length state, and it is moved toward the object side from the third intermediate focal length state to the telephoto end state. The fifth lens group G5 is fixed in a position in the direction of the optical axis upon zooming. Meanwhile, the aperture stop S is moved toward the object side integrally with the fourth lens group G4 upon zooming.

Further, focusing from the infinite distance object to the near distance object is conducted by moving the third lens group G3 toward a side of the image plane I along the optical axis.

Consequently, upon zooming, the distance between the first lens group (II and the second lens group G2 is increased, the distance between the second lens group G2 and the third lens group G3 is decreased, and the distance between the fourth lens prom G4 and the fifth lens group G5 is increased. The distance between the third lens group G3 and the fourth lens group G4 is increased from the wide-angle end state to the first intermediate focal length state, it is decreased from the first intermediate focal length state to the second intermediate focal length state, and it is increased from the second intermediate focal length state to the telephoto end state. Meanwhile, upon zooming, a distance between the aperture stop S and the third lens (group is decreased from the wide-angle end state to the first intermediate focal length state, it is increased from the first intermediate focal length state to the second intermediate focal length state, and it is decreased from the second intermediate focal length state to the telephoto end state.

Table 4 below shows various values of the variable magnification optical system according to the present. Example.

TABLE 4

Fourth Example

[Surface Data]

| m | r | d | nd | vd |
|---|---|---|---|---|
| OP | ∞ | | | |
| 1 | 128.2103 | 1.6350 | 1.950000 | 29.37 |
| 2 | 42.8046 | 8.6432 | 1.497820 | 82.57 |
| 3 | −200.0000 | 0.1000 | | |
| 4 | 42.6819 | 4.9663 | 1.816000 | 46.59 |
| 5 | 290.0414 | d5 | | |
| *6 | 500.0000 | 1.0000 | 1.851350 | 40.10 |
| 7 | 9.6706 | 3.8612 | | |
| 8 | −31.6340 | 1.0000 | 1.883000 | 40.66 |
| 9 | 50.5774 | 0.3860 | | |
| 10 | 20.2802 | 4.0969 | 1.808090 | 22.74 |
| 11 | −12.7389 | 1.0000 | 1.902650 | 35.73 |
| 12 | 182.6358 | d12 | | |
| 13 | ∞ | d13 | Aperture Stop S | |
| 14 | 22.0943 | 1.0000 | 1.883000 | 40.66 |
| 15 | 12.0211 | 3.4295 | 1.593190 | 67.90 |
| 16 | −54.4618 | d16 | | |
| 17 | 13.5315 | 7.0129 | 1.816000 | 46.59 |
| 18 | 20.2242 | 1.0000 | 1.850260 | 32.35 |
| 19 | 10.9126 | 2.0000 | | |
| 20 | 18.6799 | 3.1628 | 1.516800 | 63.88 |
| 21 | −12.1205 | 1.0000 | 1.850260 | 32.35 |
| 22 | −21.9124 | 1.5000 | | |
| *23 | −2373.2040 | 1.0000 | 1.806100 | 40.71 |
| 24 | 15.4976 | 2.3426 | | |
| 25 | 18.1342 | 5.9256 | 1.567320 | 42.58 |
| 26 | −8.0000 | 1.0000 | 1.851350 | 40.10 |
| *27 | −22.6238 | d27 | | |
| 28 | −75.6072 | 2.0606 | 1.497820 | 82.57 |
| 29 | −18.0744 | 1.0000 | 1.834410 | 37.28 |
| *30 | −25.8110 | BF | | |
| I | ∞ | | | |

[Aspherical Data]

| m | 6 | 23 | 27 | 30 |
|---|---|---|---|---|
| κ | −9.00000 | 1.00000 | 1.0000 | 1.00000 |
| A4 | 1.14894E−05 | −3.10495E−05 | −5.63578E−05 | 2.81743E−05 |
| A6 | 2.79933E−07 | 4.64001E−07 | −8.97938E−08 | −2.96842E−08 |
| A8 | −1.11589E−08 | −2.52074E−09 | 1.47935E−09 | −7.80468E−10 |
| A10 | 1.42629E−10 | 1.73753E−10 | −1.36135E−11 | 0.00000 |
| A12 | −6.44930E−13 | 0.00000 | 0.00000 | 0.00000 |

[Various Data]

zoom ratio 14.13

| | W | | T |
|---|---|---|---|
| f | 10.30 | ~ | 145.50 |
| FNO | 4.12 | ~ | 5.77 |
| ω | 39.65 | ~ | 3.02° |
| Y | 8.00 | | 8.00 |
| TL | 107.35 | ~ | 157.35 |

| | W | M1 | M2 | M3 | T |
|---|---|---|---|---|---|
| f | 10.30004 | 17.99586 | 60.49785 | 100.49280 | 145.50011 |
| ω | 39.65487 | 23.02121 | 7.21558 | 4.36760 | 3.01679 |
| FNO | 4.12 | 4.94 | 5.67 | 5.75 | 5.77 |
| φ | 8.34 | 8.34 | 9.08 | 9.22 | 10.26 |
| d5 | 2.10000 | 12.12447 | 32.02336 | 38.52508 | 41.21393 |
| d12 | 22.23850 | 16.63220 | 7.10168 | 3.99200 | 2.20000 |
| d13 | 3.91359 | 2.69844 | 3.58860 | 3.47054 | 1.80000 |
| d16 | 3.65694 | 4.87210 | 3.98774 | 4.10000 | 5.77054 |
| d27 | 1.26857 | 9.13237 | 25.54504 | 27.42933 | 32.19314 |
| BF | 14.04952 | 14.04918 | 14.04790 | 14.04914 | 14.04886 |

[Focusing Group Movement Amount Upon Focusing]

| | W | M1 | M2 | M3 | T |
|---|---|---|---|---|---|
| shooting magnification | −0.0100 | −0.0100 | −0.0100 | −0.0100 | −0.0100 |

TABLE 4-continued

Fourth Example

| shooting distance | 1002.8412 | 1751.1017 | 5887.3639 | 9762.4492 | 14160.5711 |
|---|---|---|---|---|---|
| movement amount | 0.1413 | 0.1262 | 0.1768 | 0.2719 | 0.3338 |

[Lens Group Data]

| | ST | f |
|---|---|---|
| G1 | 1 | 62.23195 |
| G2 | 6 | −9.03822 |
| G3 | 14 | 37.53030 |
| G4 | 17 | 49.24516 |
| G5 | 28 | 130.00164 |

[Values for Conditional Expressions]

| (1-1) | f3/ft = 0.258 |
|---|---|
| (1-2) | (d3T − d3W)/ft = 0.015 |
| (1-3) | f3/fim = 0.762 (fim = f4) |
| (2-1) | f3/ft = 0.258 |
| (2-2) | (d3T − d3W)/ft = 0.015 |
| (2-3) | f2/fw = −0.877 |
| (2-4) | f3/f4 = 0.762 |

Figure 17A:
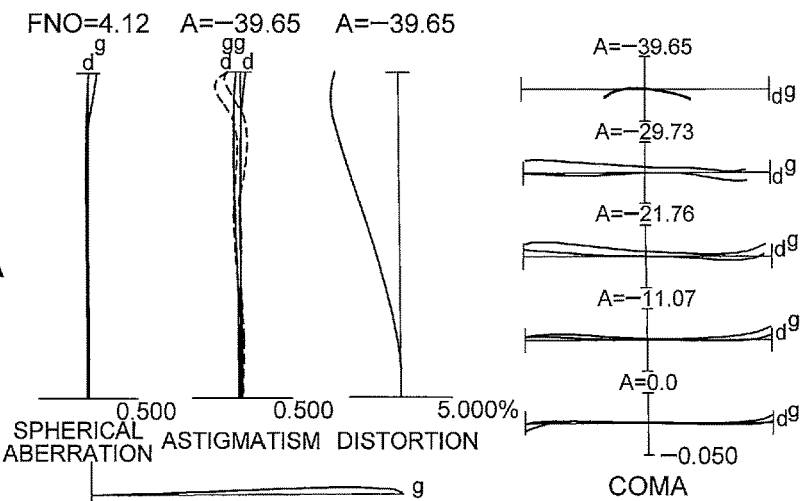
FIGS. 17A, 17B and 17C are graphs showing various aberrations of the variable magnification optical system according to the Fourth Example of the first and second embodiments of the present application upon focusing on an infinite distance object, in the wide-angle endstate, in the first intermediate focal length state, and in the second intermediate focal length state, respectively.
Figure 17B:
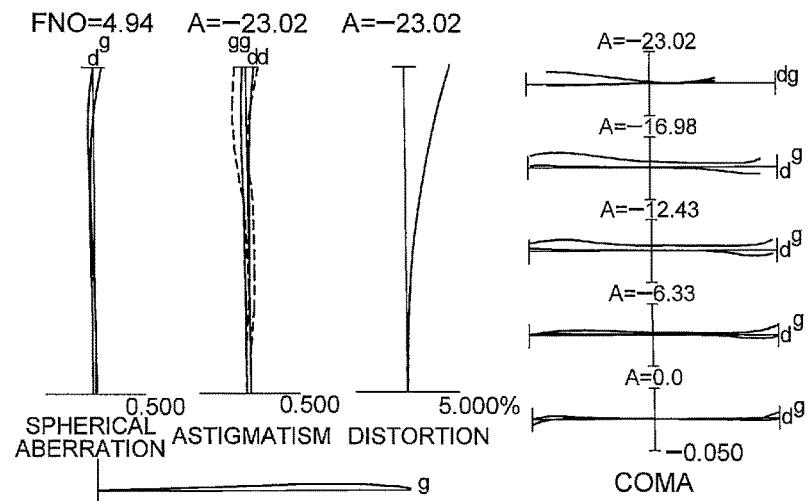
Figure 17C:
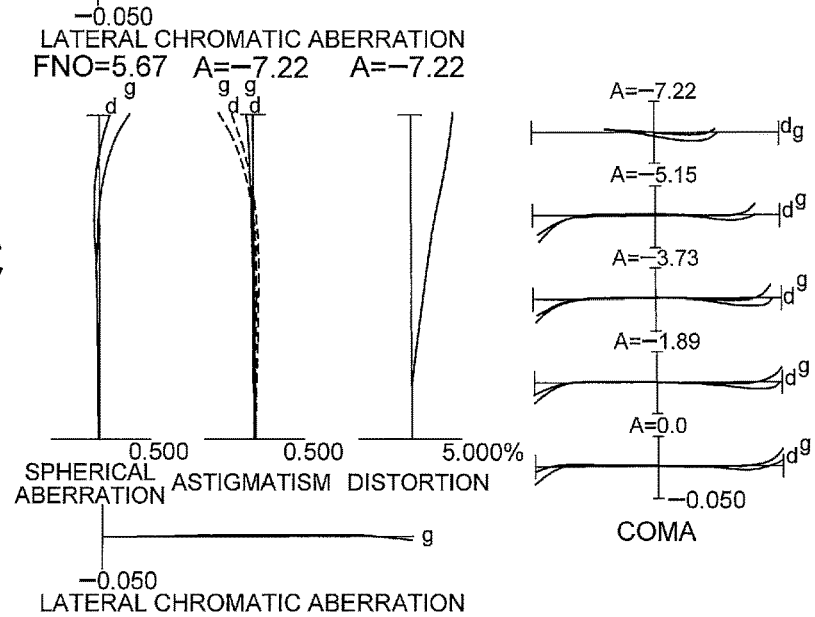

FIGS. 17A, 17B and 17C are graphs showing various aberrations of the variable magnification optical, system according to the Fourth Example of the first and second embodiments of the present application upon focusing on an infinite distance object, in the wide-angle end state, in the first intermediate focal length state, and in the second intermediate focal length state, respectively.

Figure 18A:
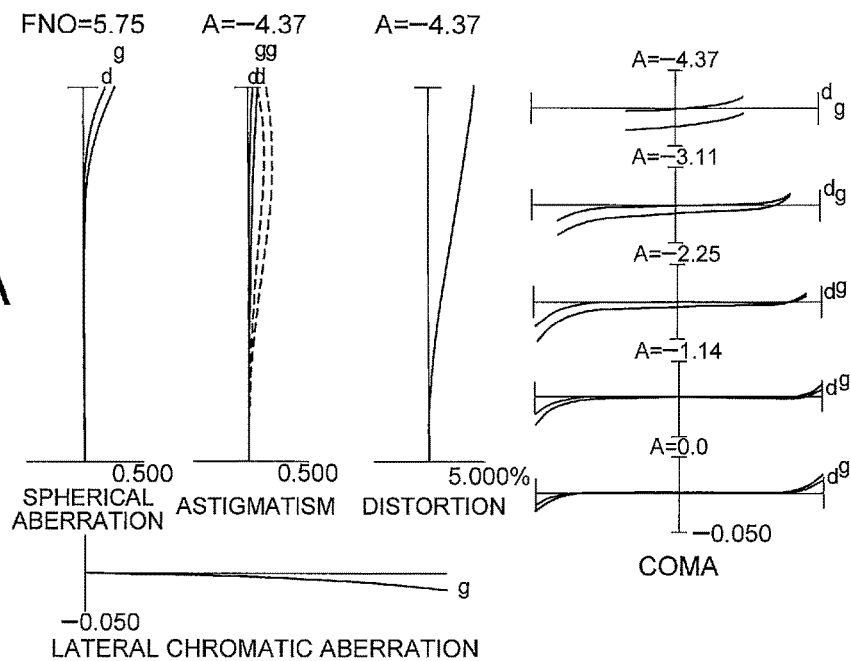
FIGS. 18A and 18B are graphs showing various aberrations of the variable magnification optical system according to the Fourth. Example of the first and second embodiments of the present application upon focusing on the infinite distance object, in the third intermediate focal length state and in the telephoto end state, respectively.
Figure 18B:
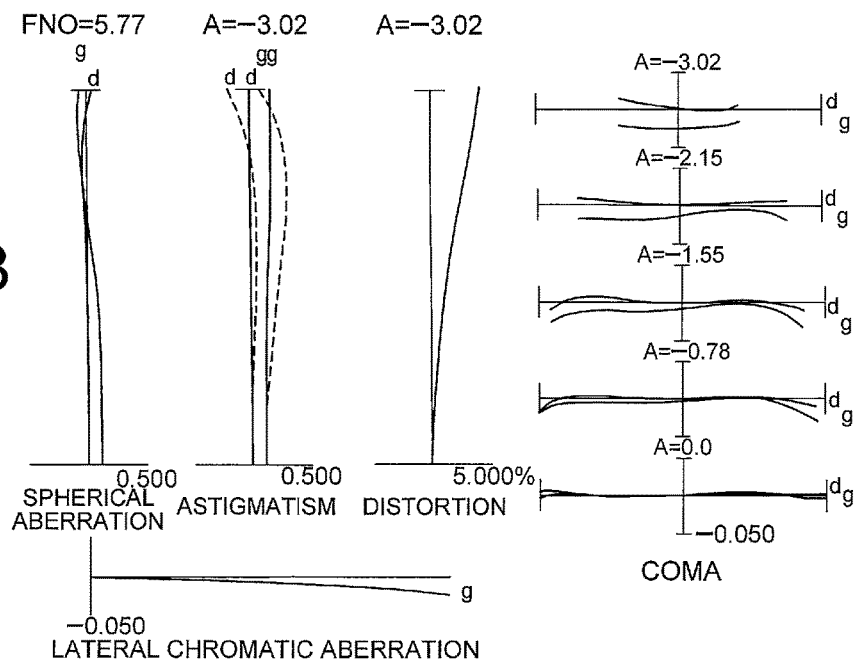

FIGS. 18A and 18B are gropes showing various aberrations of the variable magnification optical system according to the Fourth Example of the first and second embodiments of the present application upon focusing on the infinite distance object, in the third intermediate focal length state and in the telephoto end state, respectively.

Figure 19A:
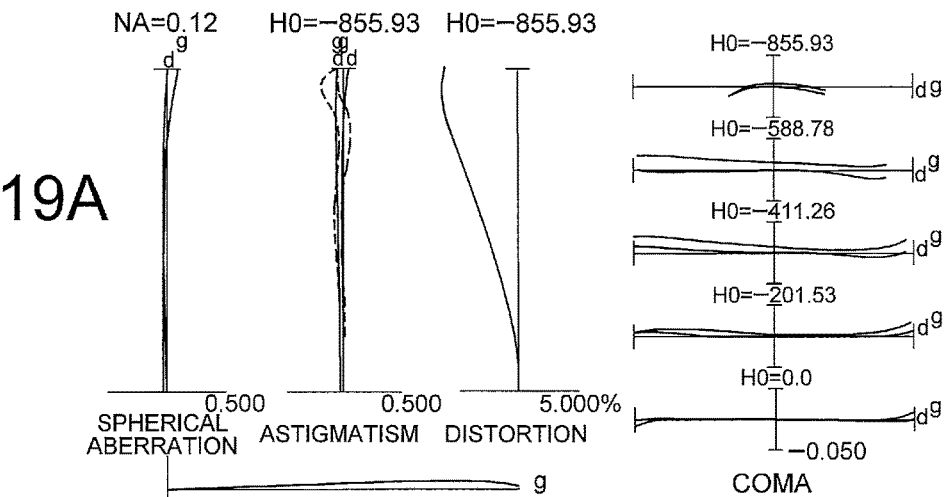
FIGS. 19A, 19B and 19C are graphs showing various aberrations of the variable magnification optical system according to the Fourth Example of the first and second embodiments of the present application upon focusing on a near distance object (shooting magnification-0.0100), in the wide-angle end state, in the first intermediate focal length state, and in the second intermediate focal length state, respectively.
Figure 19B:
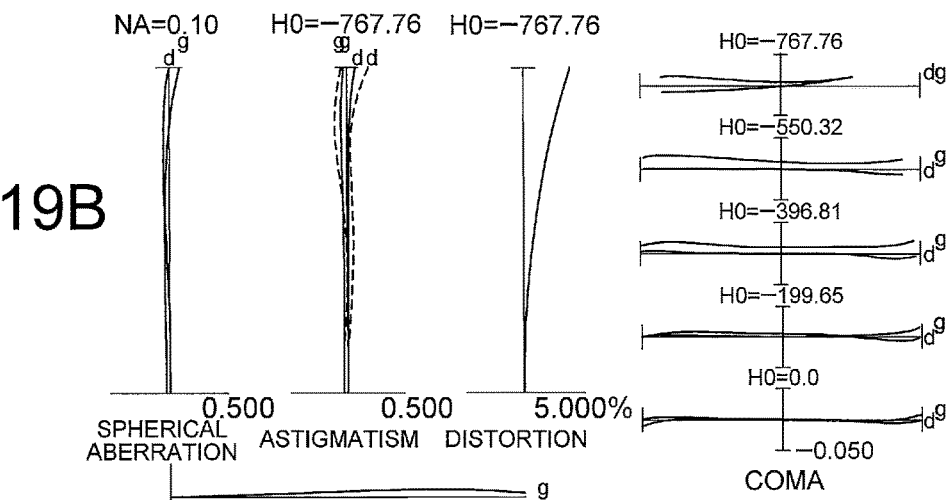
Figure 19C:
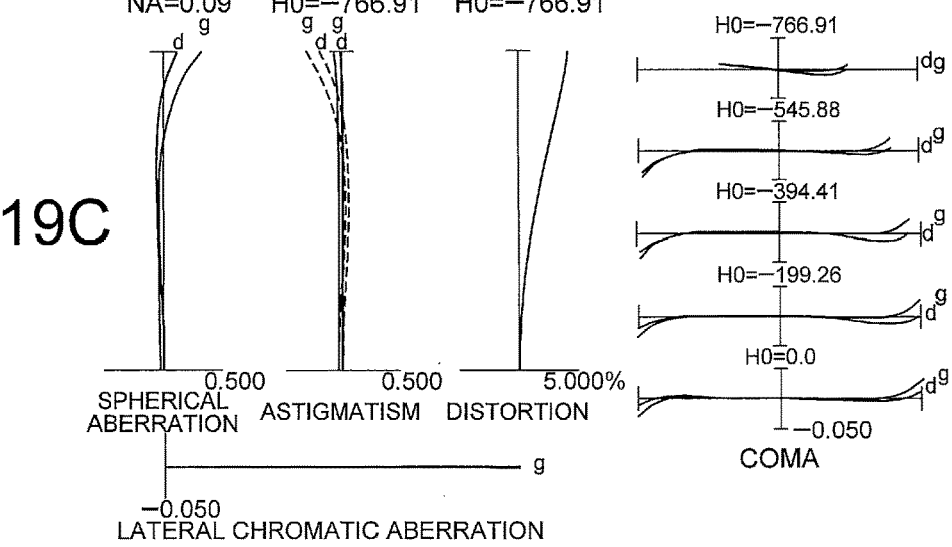

FIGS. 19A, 19B and 19C are graphs showing various aberrations of the variable magnification optical system according to the Fourth Example of the first and second embodiments of the present application upon focusing on a near distance object (shooting magnification-0.0100), in the wide-angle end state, in the first intermediate focal length state, and in the second intermediate focal length state, respectively.

Figure 20A:
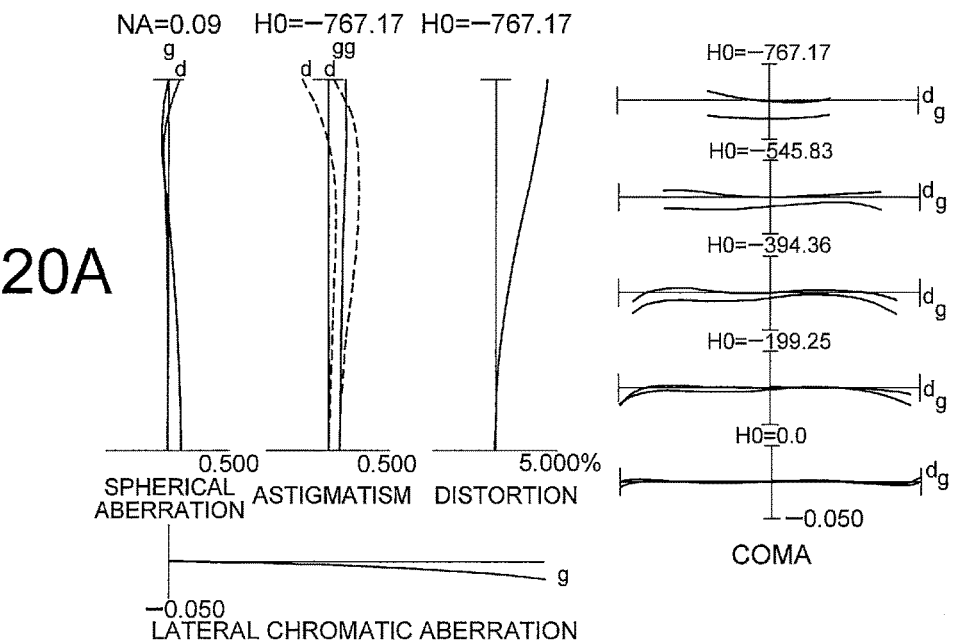
FIGS. 20A and 20B are graphs showing various aberrations of the variable magnification optical system according to the Fourth Example of the first and second embodiments of the present application upon focusing on the near distance object (shooting magnification-0.0100), in the third intermediate focal length state and in the telephoto end state, respectively.
Figure 20B:
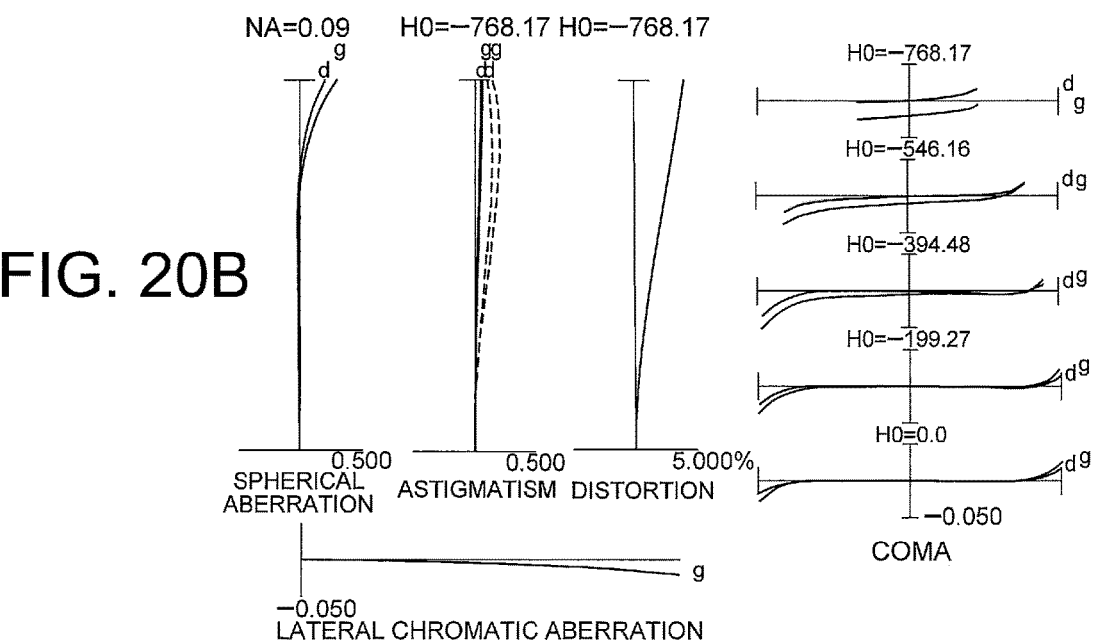

FIGS. 20A and 20B are graphs showing various aberration of the variable magnification optical system according to the Fourth Example of the first and second embodiments of the present application upon focusing on the near distance object (shooting magnification-0.0100), in the third intermediate focal length state and in the telephoto end state, respectively.

As is apparent from the respective graphs, the variable magnification optical system according to the present Example shows good corrections to various aberrations from the wide-angle end state through the telephoto end state, and also shows superb optical performance.

According to the Examples as above-mentioned, it is possible to realize a small-size variable magnification optical system having a high zoom, ratio and a high optical performance.

Note that each of the above described Examples is a concrete example of the invention of the present application, and the invention of the present application is not limited to them. The contents described below can be adopted without deteriorating an optical performance of the variable magnification optical systems of the present application.

Although the variable magnification optical systems each having five group configuration were illustrated above as numerical examples of the variable magnification optical systems of the present application, the present application is not limited to them and the variable magnification optical systems having other configurations (such as six group configuration, seven group configuration and the like) can be configured. Concretely, a lens configuration that a lens or a lens group is added to the most object side thereof is possible, and a lens configuration that a lens or a lens group is added to the most image side thereof is also possible. Meanwhile, a lens group indicates parts having at least one lens, separated by it intervals being variable upon zooming.

Further, in the variable magnification optical systems of the present application, the focusing lens group can be used for auto focus, and suitable for being driven by a motor such as an ultrasonic motor.

Further, in the variable magnification optical systems of the present application, any lens group in the entirety thereof or a portion thereof can be so moved, as a vibration reduction lens group, to have a component in a direction perpendicular to the optical axis, or rotationally moved (swayed) in an inter-plane direction including the optical axis for correcting an image blur caused by a camera shake. Particularly, in the variable magnification optical systems of the present application, it is preferable that at least a portion of the third lens group or at least a portion of the fourth lens group or at least a portion of the fifth lens group is used as a vibration reduction lens group.

Further, in the variable magnification optical systems of the present application, a lens surface of a lens may be a spherical surface, a plane surface, or an aspherical surface. When a lens surface is a spherical surface or a plane surface, lens process in assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shade by a mold, or a compound type process that a resin material on a glass lens surface is formed into an aspherical shape. A lens surface may be a diffractive optical surface, and a lens may be a graded-index type lens (GRIN lens) or a plastic lens.

Further, in the variable magnification optical systems of the present application, it is preferable that an aperture stop is disposed in the third lens group or in the vicinity of the third lens group, and the function may be substituted by a lens frame without disposing a member as an aperture stop.

Moreover, the lens surface (s) of the lenses configuring the variable magnification optical systems of the present application may be coated with anti-reflection coating(s) having a high transmittance in a broad wavelength range. With this contrivance, it is feasible to reduce a flare as well as ghost and attain a high optical performance with high contrast.

Next, a camera equipped with the variable magnification optical system according to the first and second embodiments of the present application, will be explained with referring to FIG. 21.

Figure 21:
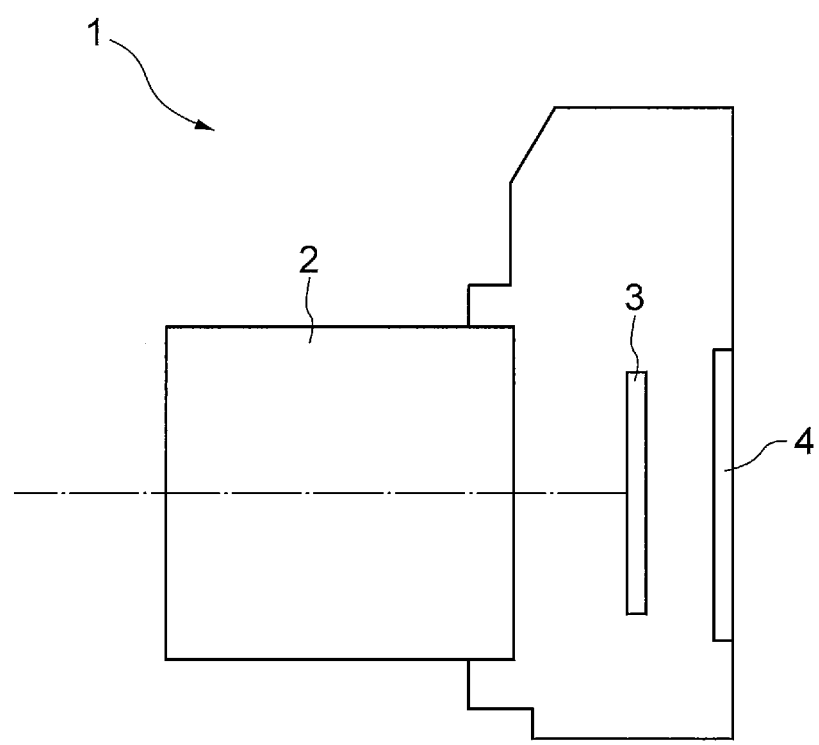
FIG. 21 is a diagram showing a construction of a camera equipped with the variable magnification optical system according to the first and second embodiments of the present application

FIG. 21 is a sectional view showing a configuration of a camera equipped with the variable magnification optical system according to the first and second embodiments of the present application.

A camera 1 is a lens interchangeable type so called mirror-less camera equipped with the variable magnification out heal system according to the first Example as en imaging lens 2, as shown in FIG. 21.

In the camera 1, light emitted from an unillustrated object (an object to be imaged) is collected by the imaging lens 2, and forms an image of the object to be imaged on an imaging plane of an imaging part 3 through an unillustrated OLPF (optical to pass filter). The image of the respect to be imaged is photo-electronically converted through a photo-electronic conversion element provided in the imaging part 3 to form an object image. This be image is displayed on an EVF (electronic view finder) 4 provided on the camera 1. Thus, a phohotographer can observe the object image through the EVF 4.

When the photographer presses an unillustrated release button, the object image formed through the imaging part 3 is stored in an unillustrated memory. Thus, the photographer can take a picture of the object to be imaged by the camera 1.

The variable magnification optical system according to the first embodiment mounted on the camera 1 as the imaging lens 2, is a small-size variable magnification optical system having a high zoom ratio and a high optical performance. Accordingly, the camera 1 can realize downsizing and a high optical performance while being provided with a high zoom ratio. Incidentally, even if the camera is so composed that the variable magnification optical system according to the second to fourth Examples is mounted on the camera as the imaging lens 2, the same effect can be attained as the camera 1. Moreover, the same effect as the above camera 1 is attained even in the case where the variable magnification optical system according to each of Examples as described, is mounted on a single lens reflex-type camera which Is provided with a quick return mirror and in which an object to be imaged is observed through a finder optical system.

Figure 22:
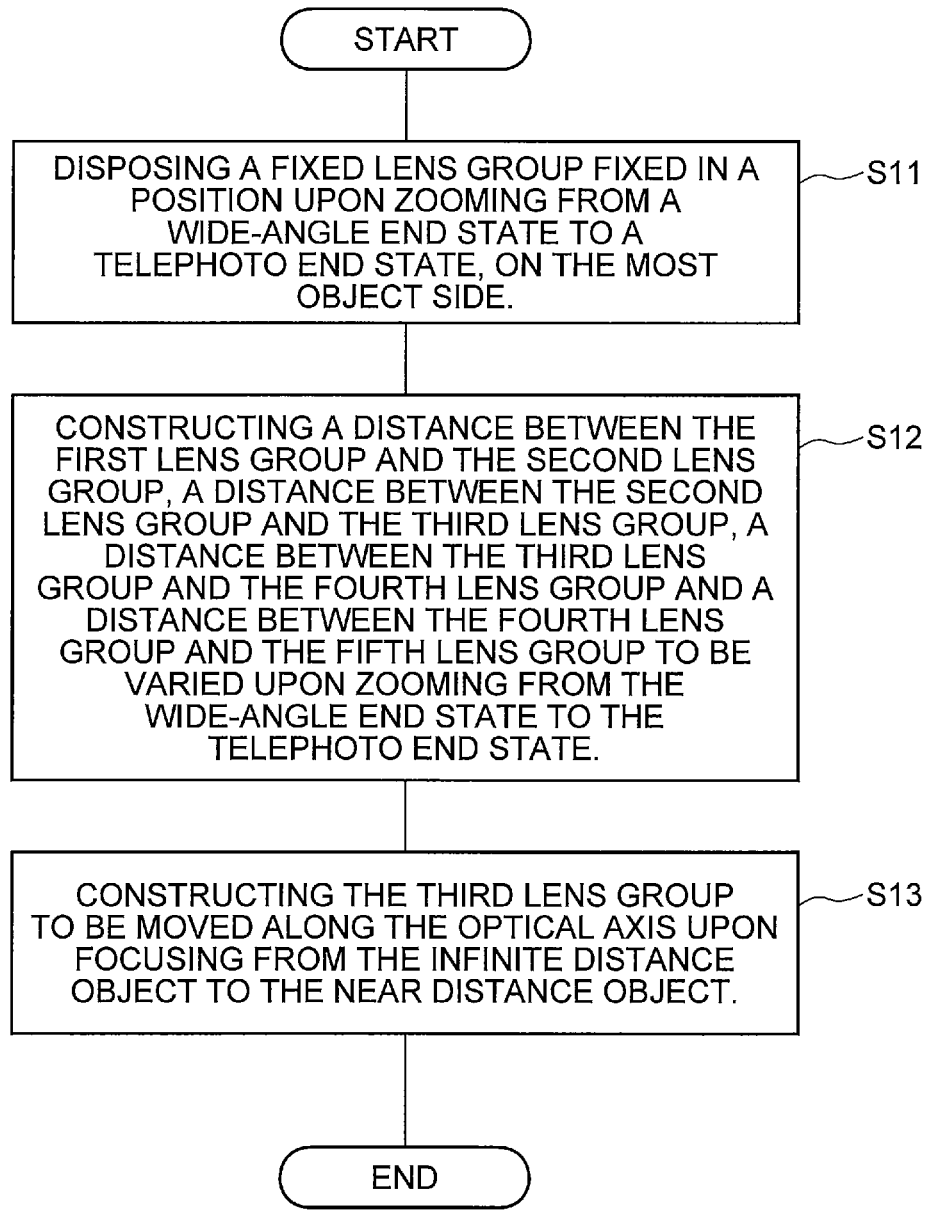
FIG. 22 is a flowchart schematically showing a method for manufacturing the variable magnification optical system according to the first embodiment of the present application.

Next, an outline of a method for manufacturing a variable magnification optical system according to the first embodiment of the present application is described with referring to FIG. 22.

In the method for manufacturing the variable magnification optical system according to the first embodiment shown in FIG. 22, the variable magnification optical system comprises, in order from an object side: a first lens group having positive refractive power; a second lens having negative refractive power; and a third lens group having positive refract ire power. The method comprises the following steps of S11 to S13:

Step S11: disposing a fixed lens croup fixed in a position upon zooming from a wide-angle end state to a telephoto end state, on the most image side of a lens barrel.

Step S12: by, for example, providing a known movement mechanism at the lens barrel, constructing a distance between the first lens group and the second lens group, a distance between the second lens group and the third lens group, a distance between the third lens group and the fourth lens group and a distance between the fourth lens group and the fifth lens group to be varied upon zooming from the wide-angle end state to the telephoto end state.

Step S13: by, for example, providing a known movement mechanism at the lens barrel, constructing the third lens group to be moved in the direction of the optical axis upon focusing from an infinite distance object to a near distance object.

Thus, the method for manufacturing the variable magnification optical system according to the first embodiment of the present application can manufacture a small-size variable magnification optical system having a high zoom ratio and a high optical performance.

Finally, an outline of a method for manufacturing a variable magnification optical system according to the second embodiment of the present application is described with referring to FIG. 23.

In the method for manufacturing the variable magnification optical system according to the second embodiment shown in FIG. 23, the variable magnification optical system comprises, in order from an object side: a first lens group having positive refractive power; a second lens group having negative refractive power; a third lens group having positive refractive power; a fourth lens group having positive refractive power; and a fifth lens group. The method comprises the following steps of S21 to S23:

Step S21: arranging the fourth lens group and the fifth lens group to satisfy the following conditional expressions (2-1) and (2-2) and disposing the respective lens groups in a lens barrel in order from the object side:

$$0.220 < f3/ft < 0.500 \quad (2\text{-}1)$$

$$-0.010 < (d3t-d3w)/ft < 0.130 \quad (2\text{-}2)$$

where ft denotes a whole system focal length of the variable magnification optical system in the telephoto end state, f3 denotes a focal length of the third lens group, d3w denotes a distance on the optical axis from a lens plane on the most image side of the third lens group to a lens surface on a most object side of the fourth lens group in the wide-angle end state, and d3t denotes a distance on the optical axis from the lens surface on the most image side of the third lens group to the lens surface on the most object side of the fourth lens group in the telephoto end state.

Step S22: by, for example, providing a known movement mechanism at the lens barrel, constructing a distance between the first lens group and the second lens group, a distance between the second lens group and the third lens group, a distance between the third lens group and the fourth lens group and a distance between the fourth lens group and the fifth lens group to be varied upon zooming from the wide-angle end state to the telephoto end state.

Step S23: by, for example, providing a known movement, mechanism at the lens barrel, constructing the third lens group to be moved along the optical axis upon focusing from an infinite distance object to a near distance object.

Thus, the method for manufacturing the variable magnification optical system according to the second embodiment of the present application can manufacture a small-size variable magnification optical system having a high zoom ratio and a high optical performance.

What is claimed is:

1. A variable magnification optical system comprising, in order from an object side: a first lens group having positive refractive power; a second lens group having negative refractive power; and a third lens group having positive refractive power;
   upon zooming from a wide-angle end state to a telephoto end state, a distance between the first lens group and the second lens group, a distance between the second lens group and the third lens group and a distance between the third lens group and an image plane being varied;
   on a most image side, a fixed lens group being fixed in a position upon zooming from the wide-angle end state to the telephoto end state; and
   the third lens group being moved along the optical axis upon focusing from an infinite distance object to a near distance object,
   wherein the fixed lens group has positive refractive power.

2. A variable magnification optical system according to claim 1, wherein the first lens group is moved toward an object side upon zooming from the wide-angle end state to the telephoto end state.

3. A variable magnification optical system according to claim 1, wherein the following conditional expression is satisfied:

$$0.220 < f3/ft < 0.500$$

where ft denotes a whole system focal length of the variable magnification optical system in the telephoto end state, and f3 denotes a focal length of the third lens group.

4. A variable magnification optical system according to claim 1, further comprising an intermediate lens group having positive refractive power which is disposed between the third lens group and the fixed lens group.

5. A variable magnification optical system according to claim 4, wherein the following conditional expression is satisfied:

$$-0.010 < (d3t-d3w)/ft < 0.130$$

where ft denotes a whole system focal length of the variable magnification optical system in the telephoto end state, d3w denotes a distance on the optical axis from a lens surface on a most image side of the third lens group to a lens surface on a most object side of the intermediate lens group in the wide-angle end state, and d3t denotes a distance on the optical axis from the lens surface on the most image side of the third lens group to the lens surface on the most object side of the intermediate lens group in the telephoto end state.

6. A variable magnification optical system according to claim 4, wherein only the intermediate lens group is disposed between the third lens group and the fixed lens group.

7. A variable magnification optical system according to claim 4, wherein the following conditional expression is satisfied:

$$0.410 < f3/fim < 1.000$$

where f3 denotes a focal length of the third lens group, and fim denotes a focal length of the intermediate lens group.

8. A variable magnification optical system according to claim 4, wherein a distance between the intermediate lens group and the fixed lens group is increased upon zooming from the wide-angle end state to the telephoto end state.

9. A variable magnification optical system according to claim 1, wherein the distance between the first lens group and the second lens group is increased upon zooming from the wide-angle end state to the telephoto end state.

10. A variable magnification optical system according to claim 1, wherein the distance between the second lens group and the third lens group is decreased upon zooming from the wide-angle end state to the telephoto end state.

11. A variable magnification optical system according to claim 1, wherein the distance between the third lens group and the image plane is increased upon zooming from the wide-angle end state to the telephoto end state.

12. A variable magnification optical system according to claim 1, wherein the third lens group is moved toward the image side upon focusing from the infinite distance object to the near distance object.

13. A variable magnification optical system according to claim 1, wherein the following conditional expression is satisfied:

$$-1.240 < f2/fw < -0.650$$

where fw denotes a whole system focal length of the variable magnification optical system in the wide-angle end state, and f2 denotes a focal length of the second lens group.

14. An optical apparatus equipped with the variable magnification optical system according to claim 1.

15. A method for manufacturing a variable magnification optical system comprising, in order from an object side: a first lens group having positive refractive power; a second lens group having negative refractive power; and a third lens group having positive refractive power; the method comprising the steps of:
   arranging the first, second and third lens groups such that, upon zooming from a wide-angle end state to a telephoto end state, a distance between the first lens group and the second lens group, a distance between the second lens group and the third lens group and a distance between the third lens group and an image plane are varied;
   disposing, on the most image side, a fixed lens group to be fixed in a position upon zooming from the wide-angle end state to the telephoto end state; and
   arranging the third lens group to be moved along the optical axis upon focusing from an infinite distance object to a near distance object,
   wherein the fixed lens group has positive refractive power.

16. A variable magnification optical system comprising, in order from an object side: a first lens group having positive refractive power; a second lens group having negative refractive power; and a third lens group having positive refractive power;
   upon zooming from a wide-angle end state to a telephoto end state, a distance between the first lens group and the second lens group, a distance between the second lens group and the third lens group and a distance between the third lens group and an image plane being varied;

on a most image side, a fixed lens group being fixed in a position upon zooming from the wide-angle end state to the telephoto end state; and the third lens group being moved along the optical axis upon focusing from an infinite distance object to a near distance object, wherein the following conditional expression is satisfied:

$-1.240 < f2/fw < -0.650$ where fw denotes a whole system focal length of the variable magnification optical system in the wide-angle end state, and f2 denotes a focal length of the second lens group.

17. A variable magnification optical system comprising, in order from an object side: a first lens group having positive refractive power; a second lens group having negative refractive power; and a third lens group having positive refractive power;

upon zooming from a wide-angle end state to a telephoto end state, a distance between the first lens group and the second lens group, a distance between the second lens group and the third lens group and a distance between the third lens group and an image plane being varied;

on a most image side, a fixed lens group being fixed in a position upon zooming from the wide-angle end state to the telephoto end state; and the third lens group being moved along the optical axis upon focusing from an infinite distance object to a near distance object, wherein the following conditional expression is satisfied:

$0.220 < f3/ft < 0.500$ where ft denotes a whole system focal length of the variable magnification optical system in the telephoto end state, and f3 denotes a focal length of the third lens group.

18. A variable magnification optical system comprising, in order from an object side: a first lens group having positive refractive power; a second lens group having negative refractive power; and a third lens group having positive refractive power;

upon zooming from a wide-angle end state to a telephoto end state, a distance between the first lens group and the second lens group, a distance between the second lens group and the third lens group and a distance between the third lens group and an image plane being varied;

on a most image side, a fixed lens group being fixed in a position upon zooming from the wide-angle end state to the telephoto end state; and the third lens group being moved along the optical axis upon focusing from an infinite distance object to a near distance object, wherein the variable magnification optical system further comprises an intermediate lens group having positive refractive power which is disposed between the third lens group and the fixed lens group, and the following conditional expression is satisfied:

$-0.010 < (d3t-d3w)/ft < 0.130$ where ft denotes a whole system focal length of the variable magnification optical system in the telephoto end state, d3w denotes a distance on the optical axis from a lens surface on a most image side of the third lens group to a lens surface on a most object side of the intermediate lens group in the wide-angle end state, and d3t denotes a distance on the optical axis from the lens surface on the most image side of the third lens group to the lens surface on the most object side of the intermediate lens group in the telephoto end state.

19. A method for manufacturing a variable magnification optical system comprising, in order from an object side: a first lens group having positive refractive power; a second lens group having negative refractive power; and a third lens group having positive refractive power; the method comprising the steps of:

arranging the first, second and third lens groups such that, upon zooming from a wide-angle end state to a telephoto end state, a distance between the first lens group and the second lens group, a distance between the second lens group and the third lens group and a distance between the third lens group and an image plane are varied;

disposing, on the most image side, a fixed lens group to be fixed in a position upon zooming from the wide-angle end state to the telephoto end state; and arranging the third lens group to be moved along the optical axis upon focusing from an infinite distance object to a near distance object, wherein the following conditional expression is satisfied:

$-1.240 < f2/fw < -0.650$ where fw denotes a whole system focal length of the variable magnification optical system in the wide-angle end state, and f2 denotes a focal length of the second lens group.

20. A method for manufacturing a variable magnification optical system comprising, in order from an object side: a first lens group having positive refractive power; a second lens group having negative refractive power; and a third lens group having positive refractive power; the method comprising the steps of:

arranging the first, second and third lens groups such that, upon zooming from a wide-angle end state to a telephoto end state, a distance between the first lens group and the second lens group, a distance between the second lens group and the third lens group and a distance between the third lens group and an image plane are varied;

disposing, on the most image side, a fixed lens group to be fixed in a position upon zooming from the wide-angle end state to the telephoto end state; and arranging the third lens group to be moved along the optical axis upon focusing from an infinite distance object to a near distance object, wherein the following conditional expression is satisfied:

$0.220 < f3/ft < 0.500$ where ft denotes a whole system focal length of the variable magnification optical system in the telephoto end state, and f3 denotes a focal length of the third lens group.

21. A method for manufacturing a variable magnification optical system comprising, in order from an object side: a first lens group having positive refractive power; a second lens group having negative refractive power; and a third lens group having positive refractive power; the method comprising the steps of:

arranging the first, second and third lens groups such that, upon zooming from a wide-angle end state to a telephoto end state, a distance between the first lens group and the second lens group, a distance between the second lens group and the third lens group and a distance between the third lens group and an image plane are varied;

disposing, on the most image side, a fixed lens group to be fixed in a position upon zooming from the wide-angle end state to the telephoto end state;

arranging the third lens group to be moved along the optical axis upon focusing from an infinite distance object to a near distance object; and disposing an intermediate lens group having positive refractive power between the third lens group and the fixed lens group, wherein the following conditional expression is satisfied:

$$-0.010 < (d3t - d3w)/ft < 0.130$$

where ft denotes a whole system focal length of the variable magnification optical system in the telephoto end state, d3w denotes a distance on the optical axis from a lens surface on a most image side of the third lens group to a lens surface on a most object side of the intermediate lens group in the wide-angle end state, and d3t denotes a distance on the optical axis from the lens surface on the most image side of the third lens group to the lens surface on the most object side of the intermediate lens group in the telephoto end state.

* * * * *